US011785478B2

(12) United States Patent
Ly et al.

(10) Patent No.: US 11,785,478 B2
(45) Date of Patent: Oct. 10, 2023

(54) UPLINK DEMODULATION REFERENCE SIGNAL BUNDLING WITH BEAM SWEEPING

(71) Applicant: QUALCOMM Incorporated, San Diego, CA (US)

(72) Inventors: Hung Dinh Ly, San Diego, CA (US); Mostafa Khoshnevisan, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 17/244,736

(22) Filed: Apr. 29, 2021

(65) Prior Publication Data
US 2022/0353694 A1 Nov. 3, 2022

(51) Int. Cl.
*H04W 4/00* (2018.01)
*H04W 16/28* (2009.01)
*H04L 5/00* (2006.01)
*H04W 72/0446* (2023.01)
*H04W 72/044* (2023.01)
*H04W 72/23* (2023.01)

(52) U.S. Cl.
CPC .......... *H04W 16/28* (2013.01); *H04L 5/0051* (2013.01); *H04W 72/046* (2013.01); *H04W 72/0446* (2013.01); *H04W 72/23* (2023.01)

(58) Field of Classification Search
None
See application file for complete search history.

(56) References Cited

U.S. PATENT DOCUMENTS

2019/0319823 A1\* 10/2019 Akkarakaran ........ H04L 5/0053
2021/0014095 A1   1/2021 Ly et al.

FOREIGN PATENT DOCUMENTS

WO    WO-2021026230 A1    2/2021

OTHER PUBLICATIONS

Xiaomi: "Discussion on mechanism of joint channel estimation", 3GPP Draft; R1-2101128, 3rd Generation Partnership Project (3GPP), Mobile Competence Centre ; 650, Route Des Lucioles ; F-06921 Sophia-Antipolis Cedex; France (Year: 2021).\*

(Continued)

*Primary Examiner* — Zewdu A Beyen
(74) *Attorney, Agent, or Firm* — Holland & Hart LLP

(57) ABSTRACT

Methods, systems, and devices for wireless communications are described. A user equipment (UE) may perform beam sweeping for a physical uplink channel within time domain windows or across time domain windows based on a time domain window index. In cases where frequency hopping is enabled, the UE may transmit uplink repetitions and demodulation reference signals (DMRSs) across two frequency hops during two consecutive time domain windows using a first transmit beam, and may then follow up with transmissions across two frequency hops during the next two consecutive time domain windows using a second transmit beam. Or, the UE may transmit uplink repetitions and DMRSs in a first frequency hop with first and second transmit beams during two respective consecutive time domain windows, and may transmit in a second frequency hop with the first and second transmit beams during the next two respective consecutive time domain windows.

11 Claims, 20 Drawing Sheets

(56) References Cited

OTHER PUBLICATIONS

Intel Corporation: "Multi-TRP Enhancements for PDCCH, PUCCH and PUSCH", R1-2100637, 3GPP TSG RAN WG1 #104-e, e-Meeting, Jan. 25-Feb. 5, 2021, (Year: 2021), 17 Pages, XP051971107, Retrieved from the Internet: URL: https://ftp.3gpp.org/tsg_ran/WG1_RL1/TSGR1_104-e/Docs/R1-2100637.zip R1-2100637.docx [Retrieved on Jan. 19, 2021] Figures 5, 6.
International Search Report and Written Opinion—PCT/US2022/071263—ISA/EPO—dated Jul. 1, 2022 (2103719WO).

* cited by examiner

UPLINK DEMODULATION REFERENCE SIGNAL BUNDLING WITH BEAM SWEEPING

FIELD OF TECHNOLOGY

The following relates to wireless communications, including uplink demodulation reference signal bundling with beam sweeping.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support uplink demodulation reference signal bundling with beam sweeping. Generally, a user equipment (UE) may be capable of bundling uplink transmission (e.g., physical uplink channel repetitions and associated demodulation reference signals (DMRSs)) for joint channel estimation. The UE may perform DMRS and uplink repetition bundling according to one or more rules. The one or more rules may define in which TTIs phase coherency can be maintained for DMRS and repetition bundling, based on frequency resource allocation (e.g., location and length), spatial transmission relation (e.g., beams), transmit power, frequency hopping, or any combination thereof. The rules may be preconfigured or standardized for UEs, or may be indicated by the base station to the UE. Such rules may be enabled or indicated for uplink repetition communication using multiple beams (e.g., directed to multiple TRPs) when joint channel estimation (e.g., DMRS bundling) is enabled.

In some examples, frequency hopping may not be enabled at the UE. A UE may perform beam sweeping for an uplink channel (e.g., PUCCH or PUSCH) within time domain windows (e.g., bundle intervals), or across time domain windows. For example, a UE may transmit all uplink transmissions within a time domain window using a same transmission beam. In some examples, a UE may transmit all coherent uplink transmissions within a time domain window using a same transmission beam, and may transmit all non-coherent uplink transmissions within the same time domain window using a different transmission beam.

In some examples, frequency hopping may not be enabled, and beam multiplexing patterns across time domain windows may depend on bundle window indices. Each time domain window may be associated with a set of spatial transmission parameters (e.g., transmit beams). The UE may send uplink transmissions and bundled DMRSs (across coherent TTIs) during a time domain window using the transmit beam associated with the index for that time domain window.

In some examples, frequency hopping may be enabled for the UE, and the base station may configure (or the UE may determine based on one or more rules) a frequency hopping pattern. In some examples (e.g., cyclic configurations), the UE may transmit uplink repetitions and DMRSs across two frequency hops during two consecutive time domain windows using a first transmit beam, and may then follow up with transmissions across two frequency hops during the next two consecutive time domain windows using a second transmit beam. In some examples (e.g., sequential configurations), the UE may transmit uplink repetitions and DMRSs in a first frequency hop with first and second transmit beams during two respective consecutive time domain windows, and may transmit in a second frequency hop with the first and second transmit beams during the next two respective consecutive time domain windows.

A method for wireless communications at a user equipment is described. The method may include receiving, from a base station, a control message identifying a configuration for the user equipment (UE) to transmit a set of multiple repetitions of a physical uplink channel, where the physical uplink channel is associated with a set of multiple demodulation reference signals, transmitting, using a first set of spatial transmission parameters associated with the configuration, a first repetition of the physical uplink channel during a first transmission time interval and a second repetition of the physical uplink channel during a second transmission time interval, where the UE maintains phase continuity in the first transmission time interval and the second transmission time interval, and transmitting, using a second set of spatial transmission parameters associated with the configuration, a third repetition of the physical uplink channel during a third transmission time interval.

An apparatus for wireless communications at a user equipment is described. The apparatus may include a processor, memory coupled with the processor, and instructions stored in the memory. The instructions may be executable by the processor to cause the apparatus to receive, from a base station, a control message identifying a configuration for the UE to transmit a set of multiple repetitions of a physical uplink channel, where the physical uplink channel is associated with a set of multiple demodulation reference signals, transmit, using a first set of spatial transmission parameters associated with the configuration, a first repetition of the physical uplink channel during a first transmission time interval and a second repetition of the physical uplink channel during a second transmission time interval, where the UE maintains phase continuity in the first transmission time interval and the second transmission time interval, and transmit, using a second set of spatial transmission parameters associated with the configuration, a third repetition of the physical uplink channel during a third transmission time interval.

Another apparatus for wireless communications at a user equipment is described. The apparatus may include means for receiving, from a base station, a control message identifying a configuration for the UE to transmit a set of multiple repetitions of a physical uplink channel, where the physical uplink channel is associated with a set of multiple demodulation reference signals, means for transmitting, using a first set of spatial transmission parameters associated with the configuration, a first repetition of the physical uplink channel during a first transmission time interval and a second repetition of the physical uplink channel during a second transmission time interval, where the UE maintains phase continuity in the first transmission time interval and the second transmission time interval, and means for transmitting, using a second set of spatial transmission parameters associated with the configuration, a third repetition of the physical uplink channel during a third transmission time interval.

A non-transitory computer-readable medium storing code for wireless communications at a user equipment is described. The code may include instructions executable by a processor to receive, from a base station, a control message identifying a configuration for the UE to transmit a set of multiple repetitions of a physical uplink channel, where the physical uplink channel is associated with a set of multiple demodulation reference signals, transmit, using a first set of spatial transmission parameters associated with the configuration, a first repetition of the physical uplink channel during a first transmission time interval and a second repetition of the physical uplink channel during a second transmission time interval, where the UE maintains phase continuity in the first transmission time interval and the second transmission time interval, and transmit, using a second set of spatial transmission parameters associated with the configuration, a third repetition of the physical uplink channel during a third transmission time interval.

Some examples of the method, apparatuses, and non-transitory computer-readable medium described herein may further include operations, features, means, or instructions for receiving, from the base station, configuration information for the UE to determine a set of multiple time domain windows for joint channel estimation, each time domain window associated with a time domain window index of a set of time domain window indices, and a spatial transmission parameter pattern indicating a first subset of the time domain window indices corresponding to the first set of spatial transmission parameters and a second subset of the time domain window indices corresponding to the second set of spatial transmission parameters.

Some examples of the method, apparatuses, and non-transitory computer-readable medium described herein may further include operations, features, means, or instructions for maintaining phase continuity of the first repetition of the physical uplink channel and the second repetition of the physical uplink channel in the first transmission time interval and the second transmission time interval according to one or more phase continuity requirements, where the first transmission time interval and the second transmission time interval may be located in a first time domain window of the set of multiple time domain windows corresponding to one of the first subset of the time domain window indices.

In some examples of the method, apparatuses, and non-transitory computer-readable medium described herein, the third transmission time interval may be located in a second time domain window corresponding to one of the second subset of the time domain window indices.

Some examples of the method, apparatuses, and non-transitory computer-readable medium described herein may further include operations, features, means, or instructions for transmitting, based on the spatial transmission parameter pattern, a fourth repetition of the physical uplink channel using the first set of spatial transmission parameters during a fourth transmission time interval located in the first time domain window, where the UE may be not capable of maintaining phase continuity in the fourth transmission time interval and at least one of the first transmission time interval or the second transmission time interval.

In some examples of the method, apparatuses, and non-transitory computer-readable medium described herein, the third transmission time interval may be located in the first time domain window corresponding to one of the first subset of the time domain window indices.

Some examples of the method, apparatuses, and non-transitory computer-readable medium described herein may further include operations, features, means, or instructions for determining that the UE may be capable of maintaining phase continuity in the first transmission time interval and the second transmission time interval, and that the UE may be not capable of maintaining phase continuity in the third transmission time interval and at least one of the first transmission time interval or the second transmission time interval, where maintaining phase continuity in the first transmission time interval and the second transmission time interval may be based on the determining.

Some examples of the method, apparatuses, and non-transitory computer-readable medium described herein may further include operations, features, means, or instructions for receiving, from the base station, configuration information for the UE to determine a set of multiple repetition transmission occasions, at least some of the repetition transmission occasions associated with time domain windows during which the UE may maintain phase continuity for joint channel estimation, each repetition transmission occasion associated with a repetition transmission occasion index of a set of repetition transmission occasion indices, and a spatial transmission parameter pattern indicating a first subset of the repetition transmission occasion indices corresponding to the first set of spatial transmission parameters and a second subset of the repetition transmission occasion indices corresponding to the second set of spatial transmission parameters.

Some examples of the method, apparatuses, and non-transitory computer-readable medium described herein may further include operations, features, means, or instructions for maintaining phase continuity of the first repetition of the physical uplink channel and the second repetition of the physical uplink channel in the first transmission time interval and the second transmission time interval according to one or more phase continuity requirements, where the first transmission time interval and the second transmission time interval may be located in a first repetition transmission occasion corresponding to one of the first subset of the time domain window indices and where the third transmission time interval may be located in a second repetition transmission occasion corresponding to one of the second subset of the repetition transmission occasion indices.

Some examples of the method, apparatuses, and non-transitory computer-readable medium described herein may further include operations, features, means, or instructions for determining that the UE may be capable of maintaining phase continuity in the first transmission time interval and the second transmission time interval, and that the UE may be not capable of maintaining phase continuity in the third transmission time interval and at least one of the first transmission time interval or the second transmission time interval, where maintaining phase continuity in the first transmission time interval and the second transmission time interval may be based on the determining.

Some examples of the method, apparatuses, and non-transitory computer-readable medium described herein may further include operations, features, means, or instructions for receiving, from the base station, configuration information for the UE to determine a set of multiple time domain windows for joint channel estimation, a frequency hopping configuration, a spatial transmission parameter pattern, or any combination thereof, maintaining phase continuity of the first repetition of the physical uplink channel and the second repetition of the physical uplink channel in the first transmission time interval and the second transmission time interval according to one or more phase continuity requirements, maintaining phase continuity of the third repetition of the physical uplink channel and a fourth repetition of the uplink physical channel in the third transmission time interval and a fourth transmission time interval according to the one or more phase continuity requirements, where the fourth repetition of the physical uplink channel may be transmitted during the fourth transmission time interval using the second set of spatial transmission parameters, maintaining phase continuity of a first set of one or more additional repetitions of the physical uplink channel in a fifth transmission time interval and a sixth transmission time interval according to the one or more phase continuity requirements, where the first set of one or more additional repetitions of the physical uplink channel may be transmitted during the fifth transmission time interval and the sixth transmission time interval using the first set of spatial transmission parameters, and maintaining phase continuity of a second set of one or more additional repetitions of the physical uplink channel in a seventh transmission time interval and an eighth transmission time interval according to the one or more phase continuity requirements, where the second set of one or more additional repetitions of the physical uplink channel may be transmitted during the seventh transmission time interval and the eighth transmission time interval using the second set of spatial transmission parameters.

In some examples of the method, apparatuses, and non-transitory computer-readable medium described herein, the first transmission time interval and the second transmission time interval may be located in a first time domain window, the third transmission time interval and the fourth transmission time interval may be located in a second time domain window, the fifth transmission time interval and the sixth transmission time interval may be located in a third time domain window, and the seventh transmission time interval and the eight transmission time interval may be located in a fourth time domain window.

Some examples of the method, apparatuses, and non-transitory computer-readable medium described herein may further include operations, features, means, or instructions for selecting, based on the frequency hopping configuration including a cyclic frequency hopping configuration, a first set of frequency resources for transmissions during the first time domain window and the second time domain window, and a second set of frequency resources for transmissions during the third time domain window and the fourth time domain window, where the first time domain window precedes the third time domain window, the third time domain window precedes the second time domain window, and the second time domain window precedes the fourth time domain window in time.

Some examples of the method, apparatuses, and non-transitory computer-readable medium described herein may further include operations, features, means, or instructions for selecting, based on the frequency hopping configuration including a sequential frequency hopping configuration, a first set of frequency resources for transmissions during the first time domain window and the third time domain window and a second set of frequency resources for transmissions during the second time domain window and the fourth time domain window, where the first time domain window and the second time domain window precedes the third time domain window and the fourth time domain window in time.

In some examples of the method, apparatuses, and non-transitory computer-readable medium described herein, the spatial transmission parameters include one or more beam configurations, one or more antenna port configurations, one or more spatial domain transmission filters, one or more spatial relations, or any combination thereof.

In some examples of the method, apparatuses, and non-transitory computer-readable medium described herein, the first set of spatial transmission parameters may be directed toward a first wireless device and the second set of spatial transmission parameters may be directed toward a second wireless device.

In some examples of the method, apparatuses, and non-transitory computer-readable medium described herein, the physical uplink channel includes a physical uplink control channel or a physical uplink shared channel.

A method for wireless communications at first base station is described. The method may include transmitting, to a UE, a control message identifying a configuration for the UE to transmit a set of multiple repetitions of a physical uplink channel using a first set of spatial transmission parameters directed toward the base station and a second set of spatial transmission parameters directed toward a second base station, receiving, from the UE using the first set of spatial transmission parameters associated with the configuration, a first set of multiple demodulation reference signals associated with the physical uplink channel during at least one of a first transmission time interval or a second transmission time interval, performing a joint channel estimation procedure in the first transmission time interval and the second transmission time interval based on receiving the first set of multiple demodulation reference signals, where phase continuity is maintained in the first transmission time interval and the second transmission time interval, and receiving, from the UE using the first set of spatial transmission parameters associated with the configuration based on the joint channel estimation procedure, a first repetition of the physical uplink channel during the first transmission time interval, and a second repetition of the physical uplink channel during the second transmission time interval.

An apparatus for wireless communications at first base station is described. The apparatus may include a processor, memory coupled with the processor, and instructions stored in the memory. The instructions may be executable by the processor to cause the apparatus to transmit, to a UE, a control message identifying a configuration for the UE to transmit a set of multiple repetitions of a physical uplink channel using a first set of spatial transmission parameters directed toward the base station and a second set of spatial transmission parameters directed toward a second base station, receive, from the UE using the first set of spatial transmission parameters associated with the configuration, a first set of multiple demodulation reference signals associated with the physical uplink channel during at least one of a first transmission time interval or a second transmission time interval, perform a joint channel estimation procedure in the first transmission time interval and the second transmission time interval based on receiving the first set of multiple demodulation reference signals, where phase continuity is maintained in the first transmission time interval and the second transmission time interval, and receive, from the UE using the first set of spatial transmission parameters associated with the configuration based on the joint channel estimation procedure, a first repetition of the physical uplink channel during the first transmission time interval, and a second repetition of the physical uplink channel during the second transmission time interval.

Another apparatus for wireless communications at first base station is described. The apparatus may include means for transmitting, to a UE, a control message identifying a configuration for the UE to transmit a set of multiple repetitions of a physical uplink channel using a first set of spatial transmission parameters directed toward the base station and a second set of spatial transmission parameters directed toward a second base station, means for receiving, from the UE using the first set of spatial transmission parameters associated with the configuration, a first set of multiple demodulation reference signals associated with the physical uplink channel during at least one of a first transmission time interval or a second transmission time interval, means for performing a joint channel estimation procedure in the first transmission time interval and the second transmission time interval based on receiving the first set of multiple demodulation reference signals, where phase continuity is maintained in the first transmission time interval and the second transmission time interval, and means for receiving, from the UE using the first set of spatial transmission parameters associated with the configuration based on the joint channel estimation procedure, a first repetition of the physical uplink channel during the first transmission time interval, and a second repetition of the physical uplink channel during the second transmission time interval.

A non-transitory computer-readable medium storing code for wireless communications at first base station is described. The code may include instructions executable by a processor to transmit, to a UE, a control message identifying a configuration for the UE to transmit a set of multiple repetitions of a physical uplink channel using a first set of spatial transmission parameters directed toward the base station and a second set of spatial transmission parameters directed toward a second base station, receive, from the UE using the first set of spatial transmission parameters associated with the configuration, a first set of multiple demodulation reference signals associated with the physical uplink channel during at least one of a first transmission time interval or a second transmission time interval, perform a joint channel estimation procedure in the first transmission time interval and the second transmission time interval based on receiving the first set of multiple demodulation reference signals, where phase continuity is maintained in the first transmission time interval and the second transmission time interval, and receive, from the UE using the first set of spatial transmission parameters associated with the configuration based on the joint channel estimation procedure, a first repetition of the physical uplink channel during the first transmission time interval, and a second repetition of the physical uplink channel during the second transmission time interval.

Some examples of the method, apparatuses, and non-transitory computer-readable medium described herein may further include operations, features, means, or instructions for transmitting, to the UE, configuration information for the UE to determine a set of multiple time domain windows for joint channel estimation, each time domain window associated with a time domain window index of a set of time domain window indices, and a spatial transmission parameter pattern indicating a first subset of the time domain window indices corresponding to the first set of spatial transmission parameters and a second subset of the time domain window indices corresponding to the second set of spatial transmission parameters, where receiving the first repetition of the physical uplink channel and the second repetition of the physical uplink channel may be based on the time domain window index of a first time domain window including the first transmission time interval and the second transmission time interval corresponding to the first set of spatial transmission parameters.

Some examples of the method, apparatuses, and non-transitory computer-readable medium described herein may further include operations, features, means, or instructions for transmitting, to the UE, configuration information for the UE to determine a set of multiple repetition transmission occasions, at least some of the repetition transmission occasions associated with time domain windows during which the UE may maintain phase continuity for joint channel estimation, each repetition transmission occasion associated with a repetition transmission occasion index of a set of repetition transmission occasion indices, and a spatial transmission parameter pattern indicating a first subset of the repetition transmission occasion indices corresponding to the first set of spatial transmission parameters and a second subset of the repetition transmission occasion indices corresponding to the second set of spatial transmission parameters, where the first repetition of the physical uplink channel and the second repetition of the physical uplink channel occur in a first repetition transmission occasion including the first transmission time interval and the second transmission time interval, and where receiving the first repetition of the physical uplink channel and the second repetition of the physical uplink channel may be based on a repetition transmission occasion index for the first repetition transmission occasion corresponding to the first set of spatial transmission parameters.

Some examples of the method, apparatuses, and non-transitory computer-readable medium described herein may further include operations, features, means, or instructions for transmitting, to the UE, configuration information for the UE to determine a set of multiple time domain windows for joint channel estimation, a frequency hopping configuration, a spatial transmission parameter pattern, or any combination thereof, where the first repetition of the physical uplink channel and the second repetition of the physical uplink channel may be received on a first set of frequency resources in accordance with the frequency hopping configuration.

Some examples of the method, apparatuses, and non-transitory computer-readable medium described herein may further include operations, features, means, or instructions for receiving, from the UE, at least a third repetition of the physical uplink channel using the first set of spatial transmission parameters on a second set of frequency resources in accordance with the frequency hopping configuration during a second time domain window consecutive to the a first time domain window including the first transmission time interval and the second transmission time interval.

Some examples of the method, apparatuses, and non-transitory computer-readable medium described herein may further include operations, features, means, or instructions for receiving, from the UE, at least a third repetition of the physical uplink channel using the second set of spatial transmission parameters on the first set of frequency resources in accordance with the frequency hopping configuration during a second time domain window consecutive to a first time domain window including the first transmission time interval and the second transmission time interval.

In some examples of the method, apparatuses, and non-transitory computer-readable medium described herein, the spatial transmission parameters include one or more beam configurations, one or more antenna port configurations, one or more spatial domain transmission filters, one or more spatial relations, or any combination thereof.

In some examples of the method, apparatuses, and non-transitory computer-readable medium described herein, the physical uplink channel includes a physical uplink control channel or a physical uplink shared channel.

DETAILED DESCRIPTION

Figure 1:
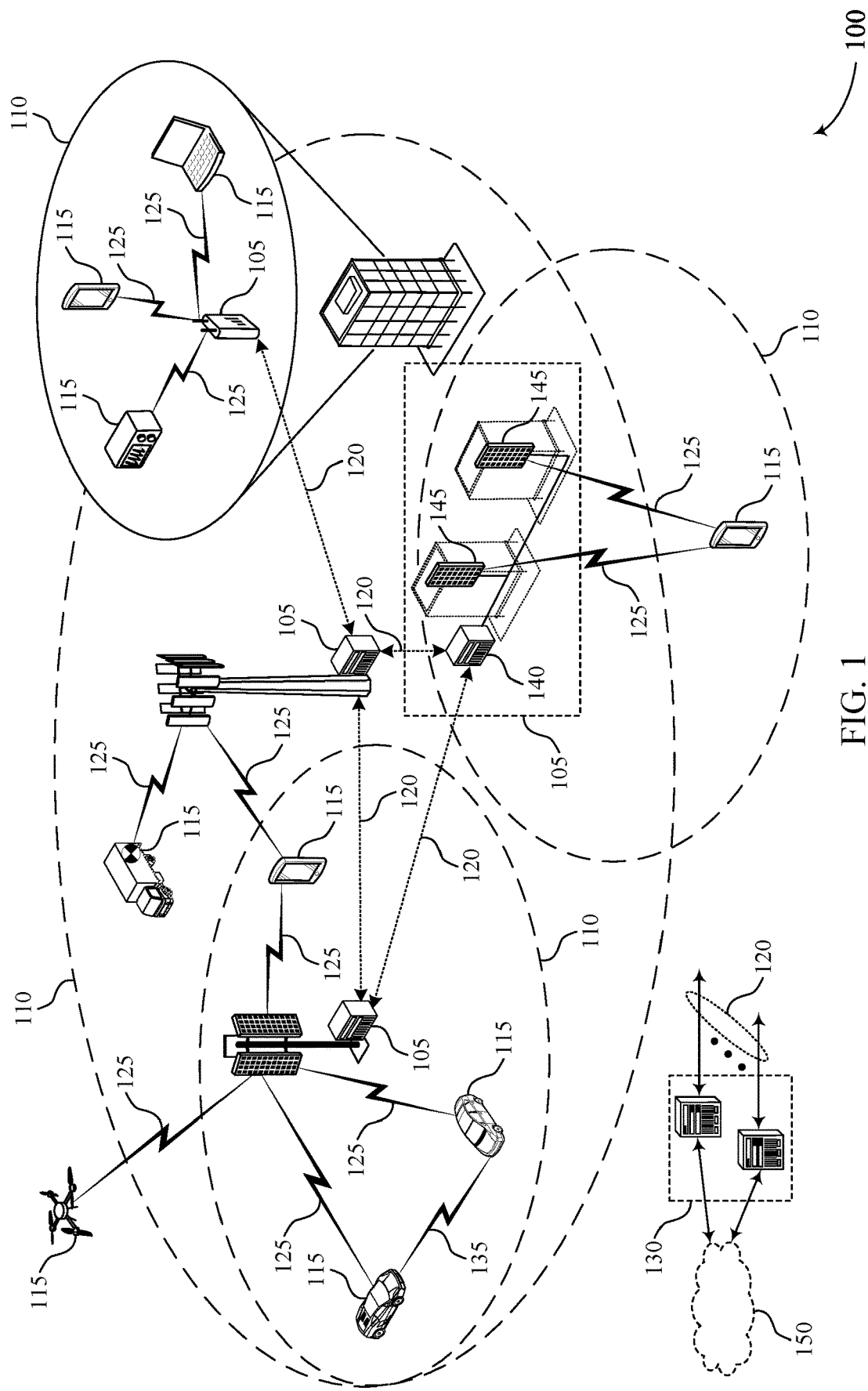
FIG. 1 illustrates an example of a wireless communications system that supports uplink demodulation reference signal bundling with beam sweeping in accordance with aspects of the present disclosure.

Some user equipments (UEs) may transmit demodulation reference signals (DMRSs) having phase continuity across multiple slots in conjunction with uplink transmissions (e.g., physical uplink shared channel (PUSCH) repetitions or physical uplink control channel (PUCCH) repetitions). Maintaining phase continuity across multiple slots may enable a base station or other recipient to aggregate the DMRSs, perform more accurate channel estimation for multiple slots, and demodulate uplink channel transmissions from the UE according to the channel estimation.

In some cases, uplink transmissions having phase-continuity across multiple slots or multiple transmissions may be said to be "bundled" across the multiple slots or multiple transmissions. Bundling one or more respective sets of uplink transmissions (e.g., PUSCH repetitions or PUCCH repetitions) may support joint processing of DMRSs at a base station (e.g., which may be referred to as joint channel estimation). The network may define a time domain window (e.g., a number of transmission time intervals (TTIs)) for maintaining phase continuity across a respective set of repetitions, where at least some repetition in a bundle interval may be transmitted with phase continuity. Such time domain windows may be referred to as bundle intervals. In some conventional systems, a UE may transmit one or more DMRSs in each slot of an uplink channel, which the receiving base station may utilize for decode repetitions of uplink channel. However, in some examples, a base station may be capable of decoding some repetitions transmitted in different TTIs (e.g., slots) with fewer DMRSs than other slots, or no DMRSs (e.g., if channel conditions are the same across the different TTIs).

According to the principles of this disclosure, a base station may configure a UE to perform DMRS enhancements (e.g., DMRS optimization procedures) whereby the UE may transmit PUSCH or PUCCH repetitions with different DMRS densities (e.g., may perform DMRS bundling where each TTI of a set of bundled TTIs does not include the same number of DMRSs). For example, a first DMRS density configuration (e.g., a first DMRS density in time) may have a first number of DMRS symbols within a TTI, and a second DMRS density configuration (e.g., a second DMRS density in time) may have a second number of DMRS symbols within a TTI. The first DMRS density configuration may be denser in time than the second DMRS density configuration. Thus, a receiving base station may perform joint channel estimation on bundled uplink repetitions received during bundled TTIs.

In some examples, a UE may be configured to communicate using multiple beams. For example, the UE may perform multiple transmit/receive point (mTRP) communications directed to multiple receiving wireless devices (e.g., multiple base stations). In such examples, the UE may transmit one or more physical uplink channel repetitions (e.g., one or more repetitions of an uplink transmission on a physical uplink channel such as a physical uplink shared channel (PUSCH) or a physical uplink control channel (PUCCH)) to a first base station using a first set of spatial transmission parameters (e.g., a first directional beam) and may transmit one or more repetitions of the physical uplink channel (e.g., may transmit one or more repetitions of the same uplink transmission) to a second base station using a second set of spatial transmission parameters (e.g., a second directional beam).

In some examples, a base station may configure a UE to perform uplink transmissions according to a frequency hopping configuration. Uplink transmissions across different beams, or uplink transmissions across different frequency resources (e.g., different frequency hops of a frequency hopping configuration) may affect whether a UE can maintain phase coherency for multiple repetitions across different TTIs. Uplink transmissions (e.g., repetitions) for which the UE can maintain phase coherency may be referred to as coherent transmissions. Conventional systems may not consider spatial transmission relations (e.g., transmitting on the same beam) for DMRS bundling (by a transmitter) and joint channel estimation (by a receiver).

To effectively realize the benefits of DRMS bundling and joint channel estimation, a UE may perform DMRS and uplink repetition bundling according to one or more rules. The one or more rules may define in which TTIs phase coherency can be maintained for DMRS and repetition bundling, based on frequency resource allocation (e.g., location and length), spatial transmission relation (e.g., beams), transmit power, or any combination thereof. The rules may be preconfigured or standardized for UEs, or may be indicated by the base station to the UE. Such rules may be enabled or indicated for uplink repetition communication using multiple beams (e.g., directed to multiple TRPs) when joint channel estimation (e.g., DMRS bundling) is enabled.

In some examples, frequency hopping may not be enabled at the UE. A UE may perform beam sweeping for an uplink channel (e.g., PUCCH or PUSCH) within time domain windows (e.g., bundle intervals), or across time domain windows. For example, a UE may transmit all uplink transmissions within a time domain window using a same transmission beam. In some examples, a UE may transmit all coherent uplink transmissions within a time domain window using a same transmission beam, and may transmit all non-coherent uplink transmissions within the same time domain window using a different transmission beam.

In some examples, frequency hopping may not be enabled, and beam multiplexing patterns across time domain windows may depend on bundle window indices. Each time domain window may be associated with a set of spatial transmission parameters (e.g., transmit beams). The UE may send uplink transmissions and bundled DMRSs (across coherent TTIs) during a time domain window using the transmit beam associated with the index for that time domain window.

In some examples, frequency hopping may be enabled for the UE, and the base station may configure (or the UE may determine based on one or more rules) a frequency hopping pattern. In some examples (e.g., cyclic configurations), the UE may transmit uplink repetitions and DMRSs across two frequency hops during two consecutive time domain windows using a first transmit beam, and may then follow up with transmissions across two frequency hops during the next two consecutive time domain windows using a second transmit beam. In some examples (e.g., sequential configurations), the UE may transmit uplink repetitions and DMRSs in a first frequency hop with first and second transmit beams during two respective consecutive time domain windows, and may transmit in a second frequency hop with the first and second transmit beams during the next two respective consecutive time domain windows.

Aspects of the disclosure are initially described in the context of wireless communications systems. Aspects of the disclosure are further illustrated by and described with reference to timelines, resource configurations, DMRS bundling schemes, and joint channel estimation schemes. Aspects of the disclosure are further illustrated by and described with reference to apparatus diagrams, system diagrams, and flowcharts that relate to uplink demodulation reference signal bundling with beam sweeping.

FIG. 1 illustrates an example of a wireless communications system 100 that supports uplink demodulation reference signal bundling with beam sweeping in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, frequency hopping may not be enabled at a UE 115. In such examples, a UE 115 may perform beam sweeping for an uplink channel (e.g., PUCCH or PUSCH) within time domain windows, or across time domain windows. For example, a UE 115 may transmit all uplink transmissions within a time domain window using a same transmission beam. In some examples, a UE 115 may transmit all coherent uplink transmissions within a time domain window using a same transmission beam, and may transmit all non-coherent uplink transmissions within the same time domain window using a different transmission beam.

In some examples, frequency hopping may not be enabled, and beam multiplexing patterns across time domain windows may depend on bundle window indices. Each time domain window may be associated with a transmit beam. The UE 115 may send uplink transmissions and bundled DMRSs (across coherent TTIs) during a time domain window using the transmit beam associated with the index for that time domain window.

In some examples, frequency hopping may be enabled, and the base station may configure (or the UE 115 may determine based on one or more rules) a frequency hopping pattern. In some examples (e.g., cyclic configurations), the UE 115 may transmit uplink repetitions and DMRSs across two frequency hops during two consecutive time domain windows using a first transmit beam, and may then follow up with transmissions across two frequency hops during the next two consecutive time domain windows using a second transmit beam. In some examples (e.g., sequential configurations), the UE 115 may transmit uplink repetitions and DMRSs in a first frequency hop with first and second transmit beams during two respective consecutive time domain windows, and may transmit in a second frequency hop with the first and second transmit beams during the next two respective consecutive time domain windows.

Figure 2:
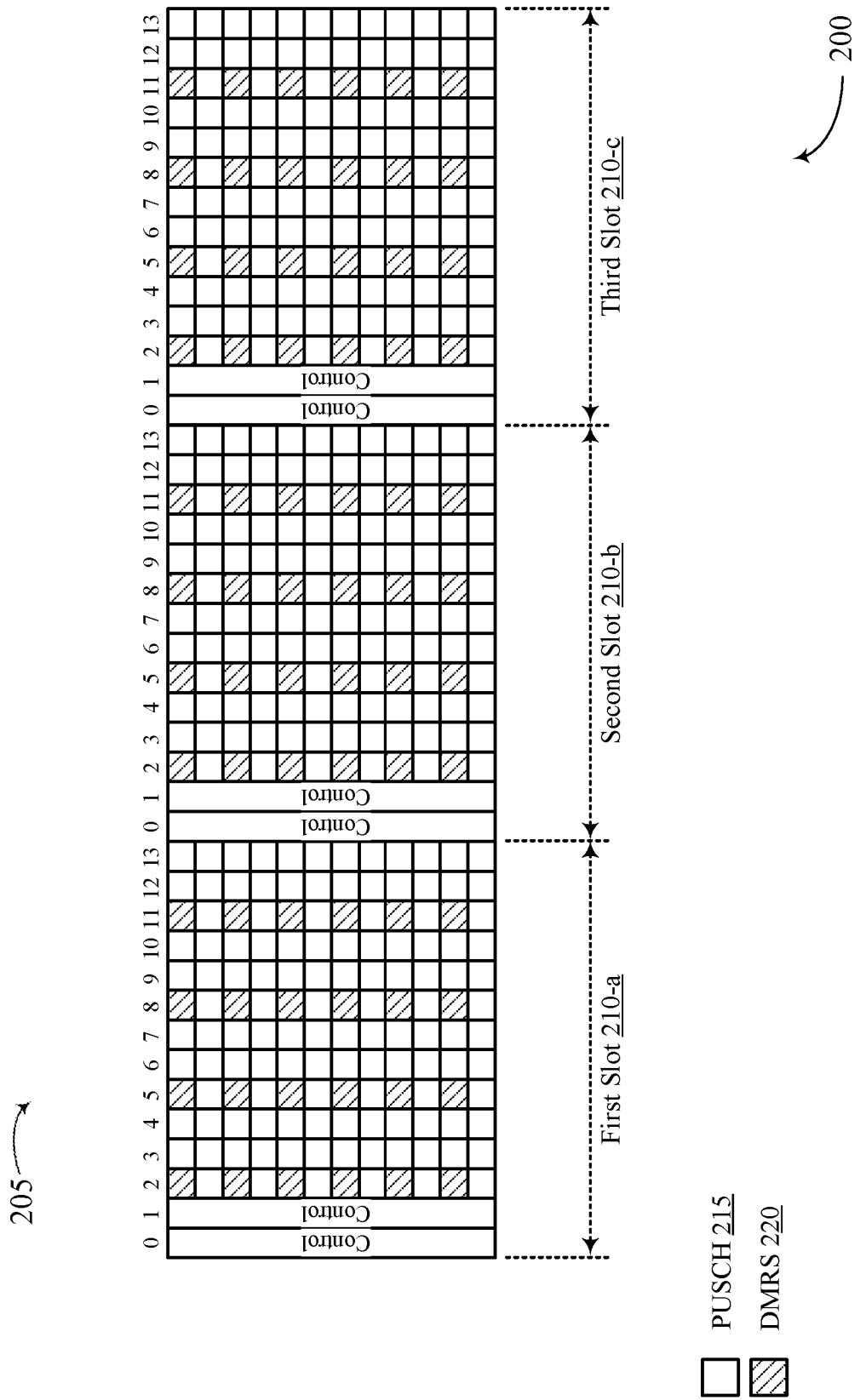
FIG. 2 illustrates an example of a resource configuration that supports uplink demodulation reference signal bundling with beam sweeping in accordance with aspects of the present disclosure.

FIG. 2 illustrates an example of a resource configuration 200 that supports uplink demodulation reference signal bundling with beam sweeping in accordance with aspects of the present disclosure. In some examples, resource configuration 200 may implement, or be implemented by, aspects of wireless communications system 100. The resource configuration 200 illustrates a set of resources 205 across multiple transmitting time intervals (TTIs), such as slots 210, which may be used for transmission/reception of phase-coherent DMRSs. Techniques described herein may be performed in slots 210, as illustrated with reference to FIG. 2, but may also be performed in any other TTI (e.g., slots, mini-slots, sub-slots, frames, subframes, or the symbols, or the like). Although illustrated with reference to a PUSCH 215, the techniques described with reference to FIG. 2 may also be implemented on a PUCCH.

A UE may transmit uplink data on a PUSCH 215 (or control information on a PUCCH). The UE may also transmit DMRSs 220, which may be mapped to resources within a slot 210. The base station may receive uplink transmissions (e.g., on PUSCH 215) and DMRSs. The base station may use the DMRSs to demodulate and decode the uplink transmissions. In some wireless communications systems (e.g., legacy communications systems), a base station may rely on the DMRSs 220 in a slot 210 to decode the uplink transmissions in that slot 210. That is, a base station may use the DMRSs 220 located in slot 210-*a* to decode the PUSCH 215 in slot 210-*a*, may use the DMRSs 220 located in slot 210-*b* to decode the PUSCH 215 in slot 210-*b*, and may use the DMRSs 220 located in slot 210-*c* to decode the PUSCH 215 in slot 210-*c*.

In some examples, some wireless communications systems (e.g., wireless communications system 100) may support jointly processing DMRSs 220 in multiple uplink transmissions (e.g., PUSCH transmissions or PUCCH transmissions) if a wireless device (e.g., a UE 115) maintains phase continuity from one slot to another slot. If a UE bundles DMRSs 220 located in different slots, but having phase continuity, then the base station may use the DMRSs of one slot 210 to decode uplink transmissions received in another bundled slot. Thus, by implementing techniques described herein, UEs 115 may transmit bundled DMRSs 220 having phase continuity (e.g., phase-coherent DMRSs 220) to improve channel estimation.

In some examples, resource configuration 200 may support uplink repetitions (e.g., PUCCH repetitions or PUSCH repetitions), which may enhance coverage. For example, a UE 115 may transmit one or more repetitions of an uplink channel (e.g., an uplink control message on a PUCCH or an uplink data message on a PUSCH). If each of slot 210-a, slot 210-b, and slot 210-c are allocated for uplink transmissions, UE 115 may transmit a first repetition of an uplink data message on PUSCH 215 in slot 210-a, a second repetition of the uplink data message on PUSCH 215 in slot 210-b, and a third repetition of the uplink data message on PUSCH 215 in slot 210-c.

In some wireless communications systems (e.g., wireless communications system 100), DMRSs 220 may be bundled across multiple slots, such that phase continuity may be maintained across multiple slots 210 and/or across the multiple transmissions. For example, in the wireless communications system 100, a UE 115 may be configured to transmit a DMRSs 220 within the first slot 210-a, the second slot 210-b, and the third slot 210-c, where phase continuity is maintained across each of the slots 210-a, 210-b, and 210-c. In this example, a base station 105 may be configured to jointly process (e.g., aggregate) the phase-coherent DMRSs 220 received across the slots 210-a, 210-b, and 210-c when performing channel estimation (e.g., cross-slot channel estimation), and may use a determined channel estimate to demodulate the PUSCH 215 received across the slots 210-a, 210-b, and 210-c.

In some examples, a UE 115 may be able to maintain phase continuity across first slot 210-a, second slot 210-b, and third slot 210-c. To maintain phase continuity, a UE 115 may satisfy one or more phase continuity rules. For instance, parameters that may be used for DMRSs 220 associated with one or more PUSCHs 215 may include, but are not limited to, phase, frequency allocations, transmission powers, transmission relations, antenna ports used for transmission schemes, precoding schemes, frequency hopping configurations, or any combination thereof. For example, as illustrated in FIG. 2, in cases where DMRSs 220 are bundled across the first slot 210-a, the second slot 210-b, and the third slot 210-c, the frequency allocation and transmit power for the DMRSs 220 within each respective slot 210 may remain the same. Conversely, phase-continuity may not be maintained across slots 210 (e.g., phase discontinuity) in cases where DMRSs 220 in respective slots 210 exhibit one or more different parameters (e.g., different phases, different frequency resource allocations within or between PUSCH slots, non-contiguous time resource allocation of PUSCH slots, different transmit powers, different antenna ports, different transmission powers, or the like). TTIs across which phase-continuity can be maintained (e.g., based on the phase continuity rules) may be referred to as coherent TTIs. Similarly, uplink transmissions (e.g., DMRSs 220, repetitions of control signals, repetitions of data signals, or the like) that can be transmitted while maintaining phase coherence may be referred to as coherent transmissions.

In cases where the UE 115 can maintain phase continuity across slot 210-a, slot 210-b, and slot 210-c, the UE 115 may perform DMRS enhancement procedures. For example, as described in greater detail with reference to FIG. 3, the UE may bundle one or more repetitions of uplink transmissions (e.g., PUCCH or PUSCH repetitions) within a slot or across one or more slots). If the UE is capable of bundling repetitions of uplink transmissions, then the UE may perform DMRS enhancement, as described in greater detail with reference to FIGS. 5-7. For instance, instead of transmitting a same number of DMRSs in each slot 210, UE 115 may transmit some repetitions of uplink channels with a first DMRS density (e.g., a first number of DMRSs and mapping of the DMRSs), and may transmit other repetitions of the uplink channel using a second DMRS density that has less DMRSs or no DMRSs. For instance, UE 115 may transmit the first repetition of the uplink channel in slot 210-a using the first DMRS density, may transmit the second repetition of the uplink channel in slot 210-b using the second DMRS density (e.g., a reduced number of DMRSs or no DMRSs), and the third repetition of the uplink channel in slot 210-c using the first DMRS density. By mapping DMRSs to the slot using such DMRS enhancement schemes, UE 115 may more efficiently use available resources without decreasing the likelihood that base station 105 cannot successfully decode the uplink channel. For example, base station 105 may receive one or more of the repetitions, and may use the DMRSs included in first slot 210-a and third slot 210-c to decode the uplink transmission received during second slot 210-b.

Figure 3:
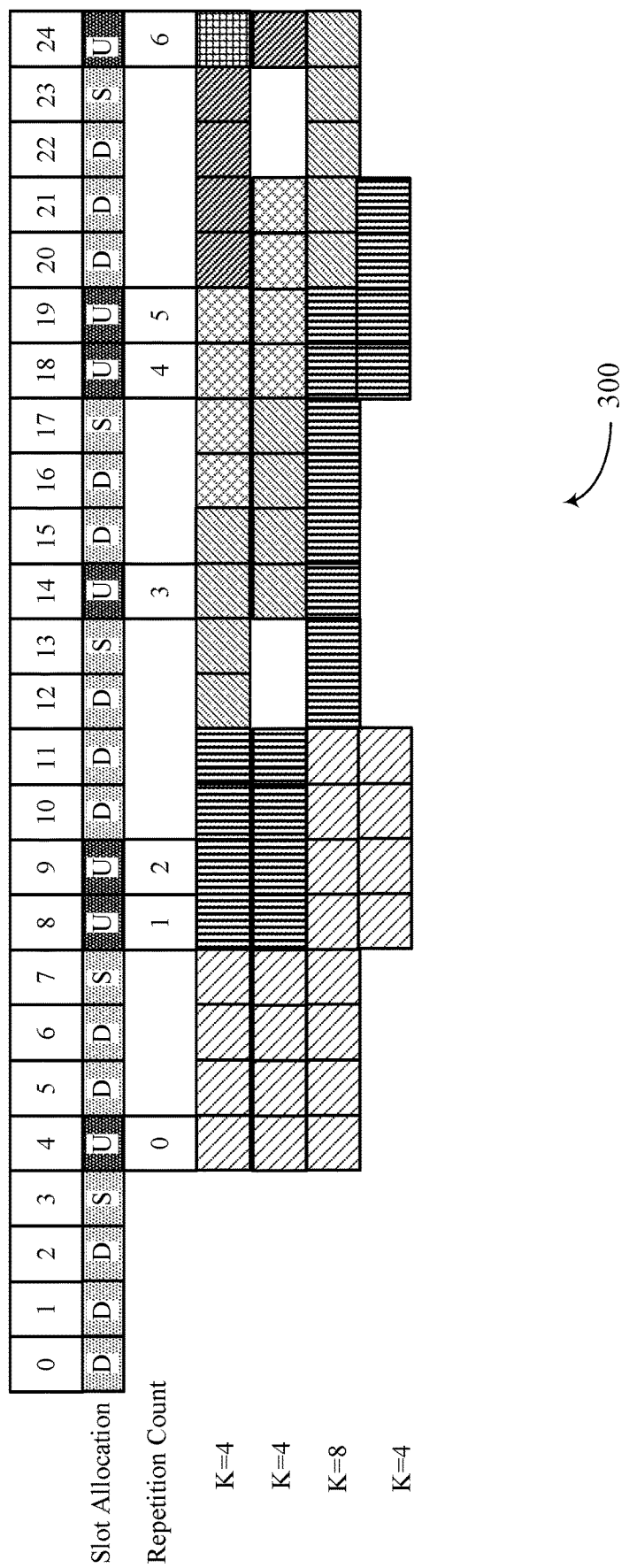
FIG. 3 illustrates an example of a DMRS bundling scheme that supports uplink demodulation reference signal bundling with beam sweeping in accordance with aspects of the present disclosure.

FIG. 3 illustrates an example of a DMRS bundling scheme 300 that supports uplink demodulation reference signal bundling with beam sweeping in accordance with aspects of the present disclosure. DMRS bundling scheme 300 may implement, or may be implemented by, a UE and a base station, which may be examples of corresponding devices described with reference to FIGS. 1 and 2.

In some examples, a base station may configure the UE with one or more time domain windows. Each time domain window may span a number of transmission time intervals (TTIs) (K). A time domain window may be defined such that a UE may coherently transmit one or more uplink repetitions within the time domain window subject to one or more phase continuity conditions. That is, if the one or more phase continuity conditions are satisfied within a time domain window, the UE may transmit uplink signaling on physical uplink channels (e.g., PUCCH transmissions or PUSCH transmissions) while maintaining phase continuity within a bundle. The base station may configure time domain windows at a UE via higher layer signaling (e.g., radio resource control (RRC) signaling), dynamic signaling (e.g., downlink control information (DCI) signaling), or the UE may implicitly determine the time domain windows based on uplink repetition transmissions configurations. Each time domain window may be the same size (e.g., have the same value for K).

The base station may also configure the UE with resource allocation information. For example, the UE may be configured with a time-division multiplexing (TDM) configuration, where each TTI is allocated as an uplink TTI (e.g., U), a downlink TTI (e.g., D), or a special (e.g., flexible) TTI (e.g., S). Some or all symbols in an S TTI may be allocated for uplink signaling, and some or all symbols in the S TTI may be allocated for downlink signaling. In some examples, a TDM resource allocation may include a pattern of U, D, and S TTIs. An illustrative example pattern may be: DDD-SUDDSUU. Such a pattern may repeat itself over time (e.g., across various TTIs).

A UE may perform uplink repetitions (e.g., PUCCH repetitions or PUSCH repetitions) in available U TTIs (or available U TTIs and S TTIs). For instance, the UE may transmit repetition zero (e.g., an initial uplink transmission) in slot 4, repetition 1 in slot 8, repetition 2 in slot 9, repetition 3 in slot 14, repetition 18 in slot 4, repetition 5 in slot 19, repetition 6 in slot 24, etc.

In some examples, the base station may configure the UE with a time domain window of K=4. The time domain window may indicate four consecutive TTIs (e.g., slots), and each time domain window may also be consecutive (e.g., a second bundle begins at the first TTI after a previous bundle ends). For instance, a first time domain window may begin in slot 4, and may span slots 4 through 7. A second time domain window may begin in the next slot (e.g., slot 8), and may span slots 8-11, etc.

In some examples, a next time domain window may begin at a next available TTI (e.g., a next U TTI or a next S TTI). For example, a first time domain window may begin in slot 4, and may span slots 4 through 7. The next available U slot may be slot 8, so the next time domain window may start at slot 8 and span slots 8-11. The next available U slot may be slot 14. So, the next time domain window may start at slot 14 (e.g., instead of slot 12), and may span slots 14-17.

In some examples, the base station may configure the UE with a time domain window of K=8. In such examples, a first time domain window may start in slot 4, and may span slots 4-11. A next time domain window may begin at slot 12 and span slots 12-19, etc.

In some examples, time domain window s may include only coherent TTIs. For example, the UE may transmit the initial uplink message during slot 4. Because slot 4 is not coherent with any other slots, the initial uplink transmission may not be included in a bundle or a time domain window. Because the first uplink repetition in slot 8 and the second uplink repetition in slot 9 are coherent, the first time domain window (e.g., K=4) may begin in slot 8, and may span slots 8-11. Instead of a second time domain window starting immediately after the first time domain window (e.g., in slot 12), or at a next available uplink TTI (e.g., in slot 14), the second time domain window may start at a next set of coherent TTIs. For example, the second time domain window may start at slot 18 (e.g., which is coherent with slot 19), and may span slots 18-21 (e.g., where K=4).

In some examples, a UE may perform DMRS enhancement of DMRS location/granularity in the time domain. For example, uplink transmissions in one slot may have different DMRS density (e.g., a different number of DMRS symbols in the slot) than uplink transmission in other slots. Or, uplink transmission in some slots may not include any DMRSs while uplink transmission in other slots have some DMRSs. In some examples, the UE may bundle some transmissions within a time domain window, and may perform DMRS enhancement on the bundled transmissions. The UE may refrain from bundling other transmissions within a same time domain window (e.g., if the other transmissions do not satisfy one or more phase continuity rules). For example, where K=8, the UE may bundle uplink transmissions for slot 8 and slot 9 within a first time domain window spanning slots 4-11, but may refrain from bundling a transmission in slot 4 with a transmission in slot 8, as described in greater detail with reference to FIG. 4.

In some examples, a UE may transmit during or outside of time domain windows using different beams, as described herein. For example, the transmitting UE may use the same or different beams for transmissions within time domain windows, or may use different beams for different time domain window indices, as described in greater detail with reference to FIG. 7. In some examples, the UE may use different beams for different repetition transmission occasions (e.g., whether inside or outside of a time domain window), as described in greater detail with reference to FIG. 8. In some examples, the UE may map different time domain windows to different beams, as described in greater detail with reference to FIG. 9. In some examples, The UE may map different frequency hops, different beams, or both, to different time domain windows, as described in greater detail with reference to FIG. 10.

Figure 4:
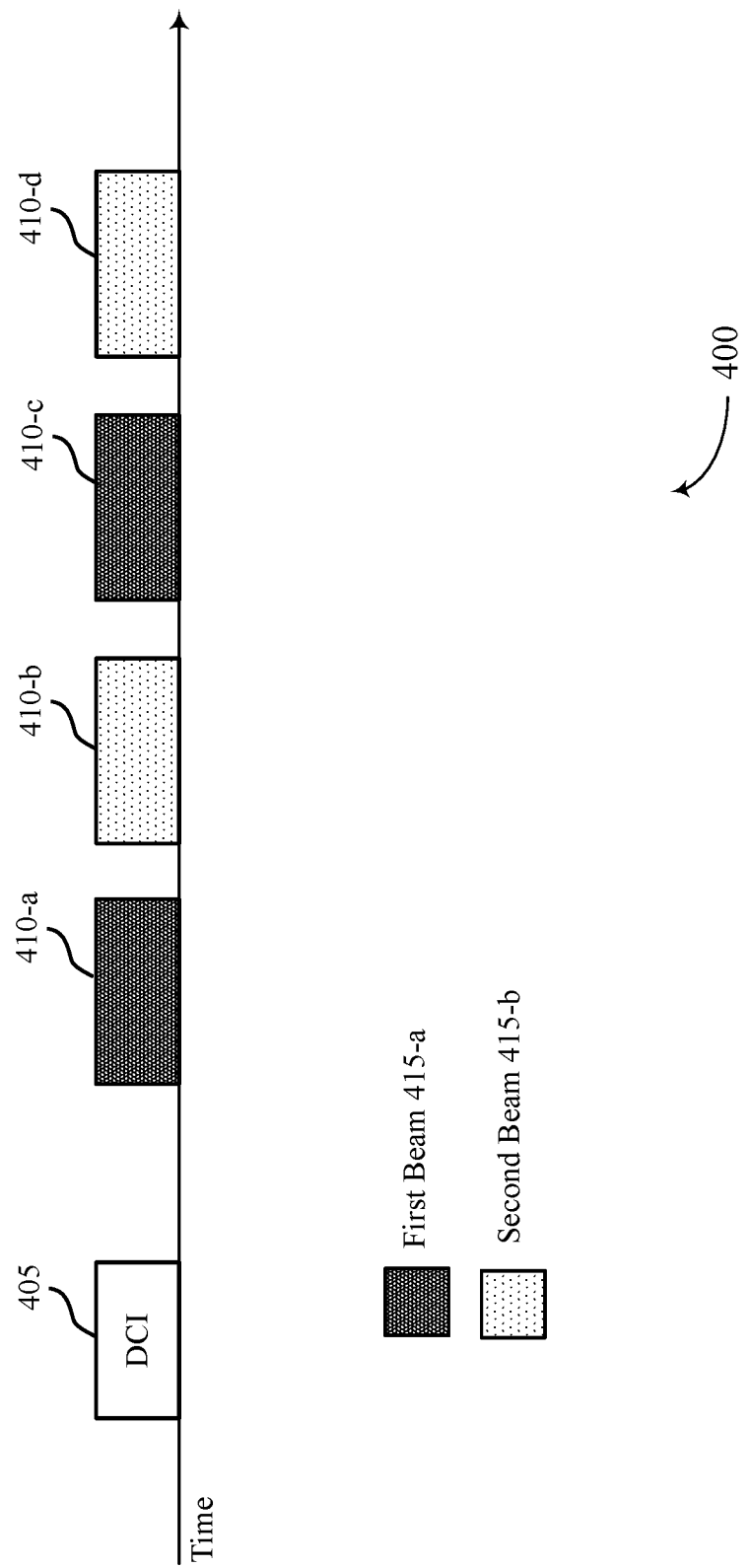
FIG. 4 illustrates an example of a timeline that supports uplink demodulation reference signal bundling with beam sweeping in accordance with aspects of the present disclosure.

FIG. 4 illustrates an example of a timeline 400 that supports uplink demodulation reference signal bundling with beam sweeping in accordance with aspects of the present disclosure. Timeline 400 may implement aspects of, or be implemented by, one or more wireless devices, such as a UE and a base station, which may be examples of corresponding devices described with reference to FIGS. 1-3.

In some examples, a base station may configure a UE to transmit one or more repetitions of uplink signaling on an uplink channel (e.g., a PUCCH or a PUSCH). For example, a base station may transmit, to the UE, a DCI 405. The DCI 405 may include an uplink grant (e.g., for control signaling on a PUCCH, data signaling on a PUSCH, or the like). The uplink grant may configure the UE to transmit one or more repetitions 410 of an uplink message.

In some examples, the DCI 405 may configure multi-beam PUSCH or PUCCH transmissions (e.g., to multiple TRPs). The multi-beam transmissions may be configured in a TDM configuration. DCI 405 may indicate uplink repetitions (e.g., PUCCH or PUSCH repetitions) with different beams. Such configurations may be applicable to type-A repetitions, type-B repetitions, or any combination thereof. A UE may transmit repetitions using one or more spatial parameters. Spatial transmission parameters may refer to spatial relation information, beams, precoders, ULPC parameters, antenna ports, or the like. In some examples, as described herein, transmitting signaling on a beam may refer to performing an uplink transmission using a particular set of spatial transmission parameters.

DCI 405 may configure the multi-beam repetitions according to a beam sweeping or beam multiplexing pattern. For example, DCI 405 may indicate an alternating pattern. In such examples, the UE may transmit a first repetition 410-*a* of the uplink message (e.g., to a first TRP) using a first beam 415-*a*, a second repetition 410-*b* of the uplink message (e.g., to the second TRP) using a second beam 415-*b*, a third repetition 410-*c* of the uplink message (e.g., to the first TRP) using the first beam 415-*a*, and a fourth repetition 410-*d* of the uplink message (e.g., to the second TRP) using the second beam 415-*b*. The beam multiplexing pattern may be more sequential. For example, the UE may transmit multiple (e.g., two) consecutive repetitions on the first beam 415-*a*, followed by multiple (e.g., two) consecutive repetitions on the second beam 415-*b*. Beam multiplexing patterns may apply to any number of transmit beams, may repeat or cycle through any number of times, and may apply to any number of configured uplink repetitions (e.g., 4 repetitions, as illustrated with reference to FIG. 4, 8 repetitions, 16 repetitions, or the like). In some examples, as described in greater detail with reference to FIGS. 7-10, the UE may perform DMRS and repetition bundling, and may transmit repetitions and DMRSs according to the DMRS and repetition bundling using different beams. For example, DCI 405 may include an indication of the repetitions 410, and UE 115 may determine which beam 415 to use based on a preconfigured pattern, a pattern indicated in DCI 405, one or more rules, or any combination thereof.

Figure 5:
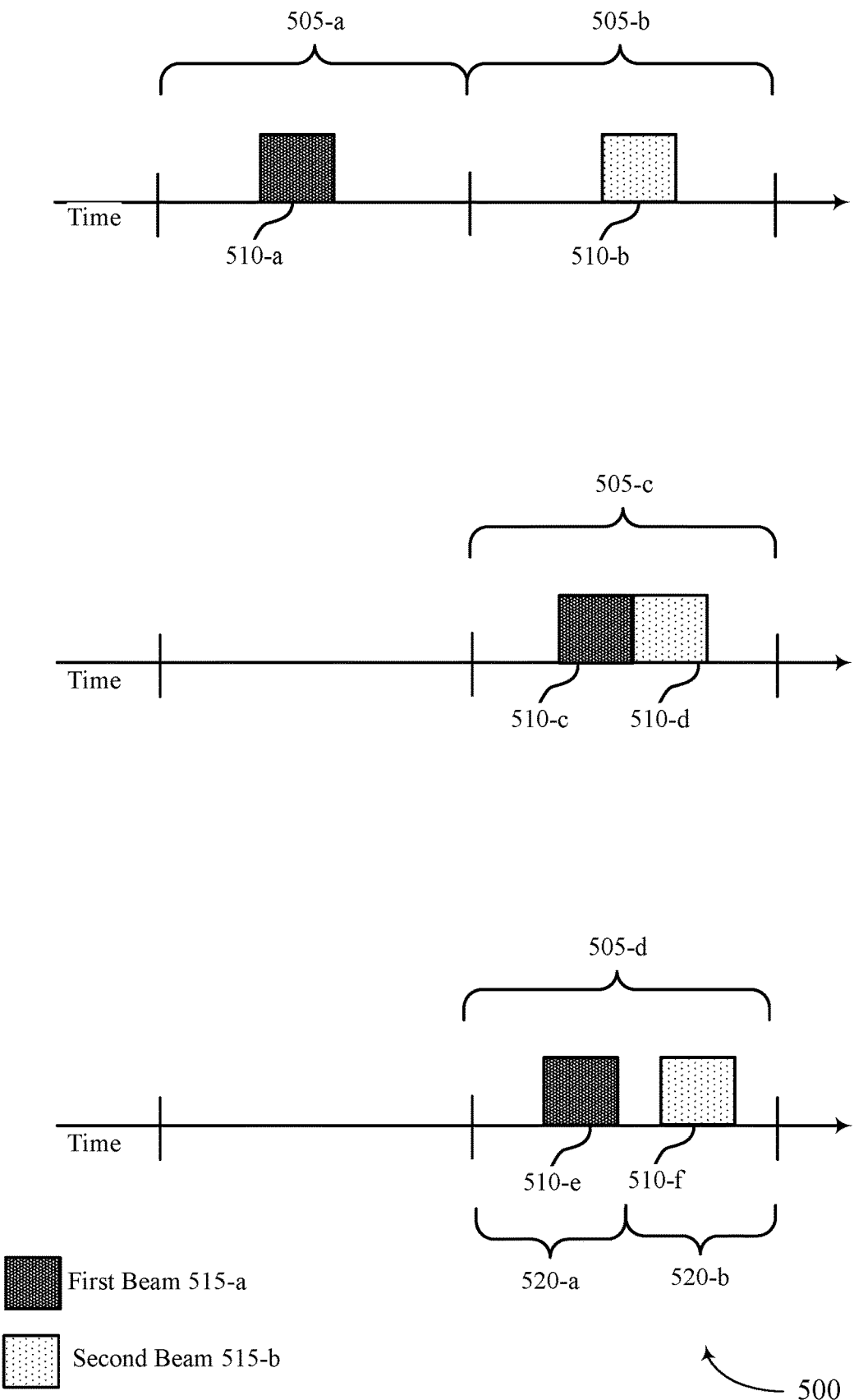
FIG. 5 illustrates an example of a timeline that supports uplink demodulation reference signal bundling with beam sweeping in accordance with aspects of the present disclosure.

FIG. 5 illustrates an example of a timeline 500 that supports uplink demodulation reference signal bundling with beam sweeping in accordance with aspects of the present disclosure. Timeline 500 may implement aspects of, or be implemented by, one or more wireless devices, such as a UE and a base station, which may be examples of corresponding devices described with reference to FIGS. 1-4.

A base station may configure a UE to transmit one or more repetitions of an uplink message across or during one or more TTIs. Although techniques described with reference to FIG. 5 may refer to slots 505, similar techniques may be performed across or during any TTI (e.g., slot, mini-slot, sub-slot, frame, subframe, symbol, or the like).

A UE may perform inter-slot PUCCH or PUSCH repetition with different beams 515. For example, one PUCCH or PUSCH resources may be activated with two sets of spatial relation information (e.g., two beams 515). For example, a base station may transmit a DCI that schedules one or more repetitions 510 of an uplink message on a PUCCH or PUSCH. The base station may configure two sets of power control parameters for the two sets of repetitions. In such examples, the UE may be configured to transmit a first repetition 510-a using a first beam 515-a in a first TTI (e.g., slot 505-a), and to transmit a second repetition 510-b using a second beam 515-b in a second TTI (e.g., slot 505-b).

A UE may perform intra-slot PUCCH or PUSCH repetitions using different beams. For example, the UE may perform intra-PUCCH or intra-PUSCH resource beam hopping. In such examples, a base station may schedule (e.g., via a DCI) one or more repetitions 510 within a single TTI (e.g., slot 505-c) using different beams 515. For instance, base station may schedule the UE to transmit one or more repetitions 510, including repetition 510-c and repetition 510-d. The repetitions 510 may be scheduled across physical uplink channel resources (e.g., PUCCH resources or PUSCH resources) spanning a number of symbols N. Each repetition 510 may therefor span a number of symbols equal to the number of symbols divided by a number of repetitions 510. Thus, each of the two repetitions 510-c and repetition 510-d may span N/2 symbols. Additional repetitions (e.g., any number of repetitions) may be scheduled during a single TTI (e.g., 505-c. The UE may thus transmit repetition 510-c during slot 505-c using the first beam 515-a and may transmit repetition 510-c during slot 505-c using the second beam 515-b.

In some examples, the UE may perform sub-slot based PUCCH repetition or PUSCH repetition using different beams 515. For example, the base station may configure the UE to transmit one or more repetitions 510 during a slot 505-d. The UE may transmit repetition 510-e using first beam 515-a during sub-slot 520-a of slot 505-d, and may transmit repetition 510-f using second beam 515-b during sub-slot 520-b of slot 505-d.

As described with reference to FIGS. 7-10, the UE may transmit multiple repetitions of an uplink message using different beams within or across time domain windows (e.g., bundle intervals). The repetitions may be transmitted across multiple TTIs (e.g., inter-slot repetitions) using different beams, or within individual TTIs (e.g., intra-slot repetitions) using different beams, or any combination thereof, as described with reference to FIG. 5.

In some examples, a UE may transmit uplink repetitions according to a frequency hopping configuration, as described in greater detail with reference to FIG. 6.

Figure 6:
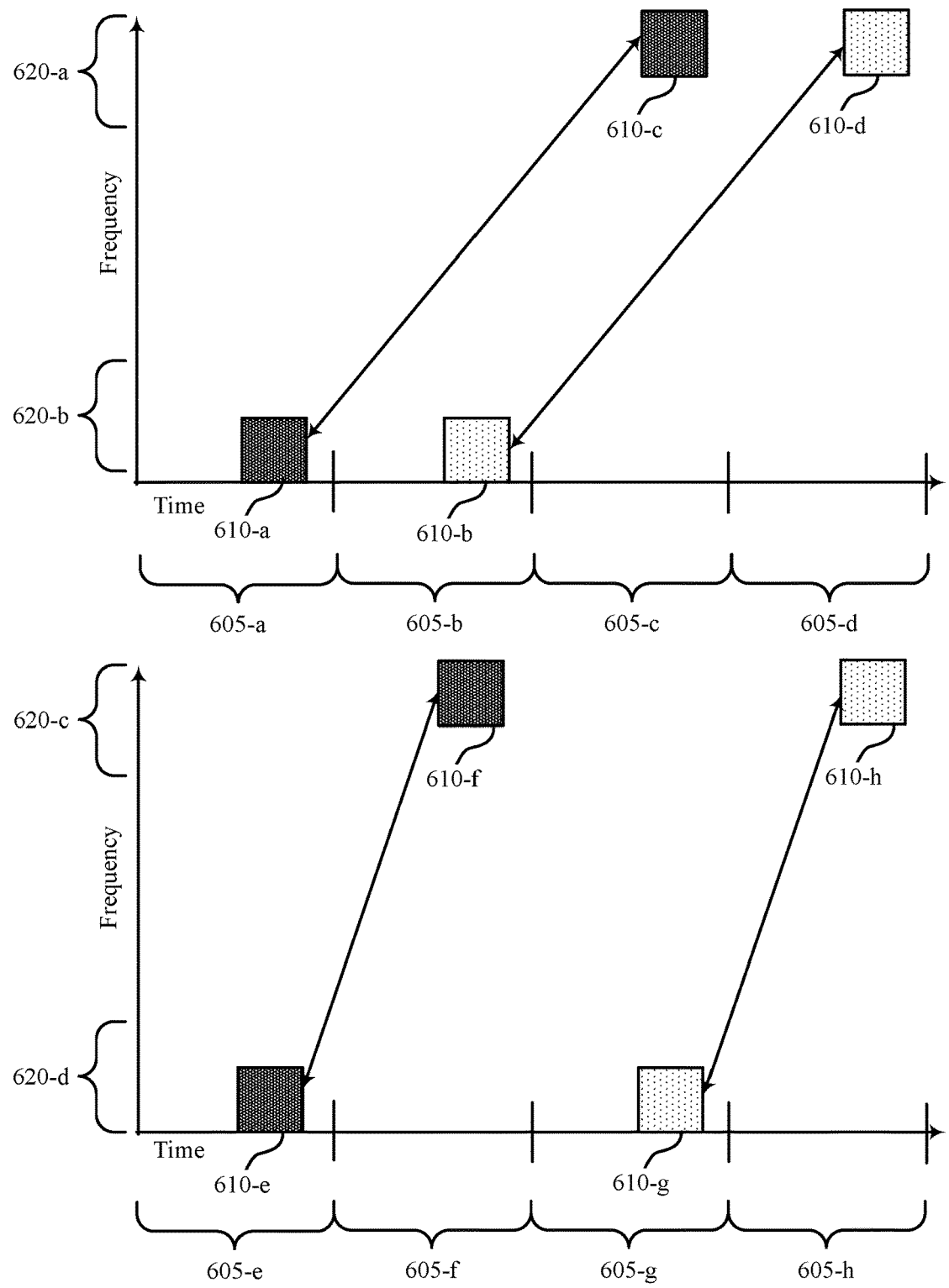
FIG. 6 illustrates an example of a frequency hopping scheme that supports uplink demodulation reference signal bundling with beam sweeping in accordance with aspects of the present disclosure.

FIG. 6 illustrates an example of a frequency hopping scheme 600 that supports uplink demodulation reference signal bundling with beam sweeping in accordance with aspects of the present disclosure. Frequency hopping scheme 600 may implement aspects of, or be implemented by, one or more wireless devices, such as a base station or a UE, which may be examples of corresponding devices described with reference to FIGS. 1-5. Although illustrated and described with reference to slots 605, frequency hopping scheme 600 may be implemented across any type of TTI (e.g., slots, sub-slots, mini-slots, symbols, frames, sub-frames, or the like). Although illustrated and described with reference to an inter-slot scheme, techniques described with reference to FIG. 6 may be similarly implemented in intra-slot schemes as described with reference to FIG. 5.

A UE may transmit multiple repetitions on an uplink channel (e.g., PUCCH and PUSCH) according to a frequency hopping configuration. In some examples a base station may enable frequency hopping at the UE. For example, the base station may configure the UE with an indication of one or more frequency hops (e.g., sets of one or more frequency resources), a frequency hopping pattern, or the like.

The UE may transmit repetitions 610 of an uplink message (e.g., on a PUCCH or PUSCH) in different frequency hops 620. The UE may map repetitions 610 to different beams 615 according to a mapping pattern. The mapping pattern may be defined in one or more standards, preconfigured at the UE, or configured by the base station (e.g., via control signaling).

In some examples, the mapping may be cyclic. In such examples, the UE may first transmit any repetitions 610 in a frequency hop 620-b, cycling through a set of beams 615 in the frequency hop 620-b, and may then transmit any repetitions 610 in another frequency hop 620-a, cycling through the set of beams 615 in the frequency hop 620-a. For instance, the UE may transmit a repetition 610-a during slot 605-a using first beam 615-a in frequency hop 620-b. The UE may transmit repetition 610-b during slot 605-b using second beam 615-b in frequency hop 620-b. Then, the UE may transmit repetition 610-c in slot 605-c using first beam 615-a in frequency hop 620-a, and may transmit repetition 610-d in slot 605-d using second beam 615-b in frequency hop 620-a.

In some examples, the mapping may be sequential. In such examples, the UE may first transmit any repetitions 610 using first beam 615-a across frequency hops 620, and may then transmit any repetitions 610 using second beam 615-b across the frequency hops. For instance, the UE may transmit a first repetition 610-e in slot 605-e using first beam 615-a in frequency hop 620-d, and may then transmit a second repetition 610-f in slot 605-f using first beam 615-a in frequency hop 620-c. Then, the UE may transmit a third repetition 610-g in slot 605-g using second beam 615-b in frequency hop 620-d, and may transmit a fourth repetition 610-h in slot 605-h using second beam 615-b in frequency hop 620-c.

In some examples, as described in greater detail with reference to FIG. 10, a UE may have frequency hopping enabled, and may also be configured with one or more time domain windows (e.g., bundle intervals) for joint channel estimation. In such examples, the UE may apply the cyclic or sequential mapping of repetitions 610 to beams 615 within or across time domain windows.

Figure 7:
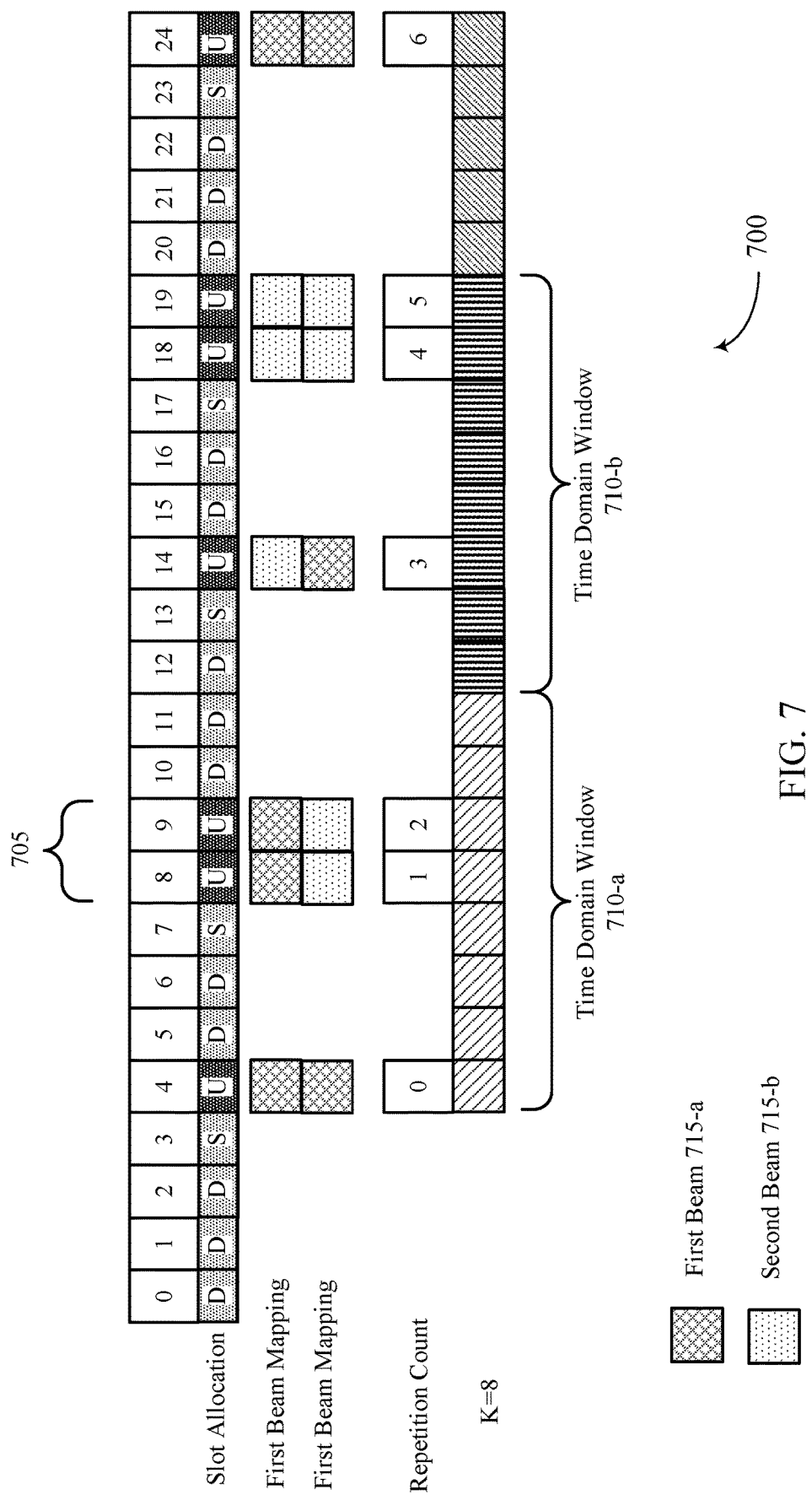
FIG. 7 illustrates an example of a joint channel estimation scheme that supports uplink demodulation reference signal bundling with beam sweeping in accordance with aspects of the present disclosure.

FIG. 7 illustrates an example of a joint channel estimation scheme 700 that supports uplink demodulation reference signal bundling with beam sweeping in accordance with aspects of the present disclosure. Joint channel estimation scheme 700 may be implemented by, or implement aspects of, one or more wireless devices, such as a base station and a UE, which may be examples of corresponding devices described with reference to FIGS. 1-6.

In some examples, a base station may configure the UE with one or more time domain windows 710. Each time domain window 710 may span a number of transmission time intervals (TTIs) (K). A time domain window 710 may be defined such that a UE may coherently transmit one or more uplink repetitions within the time domain window 710 subject to one or more phase continuity conditions or requirements. That is, if the one or more phase continuity conditions are satisfied within a time domain window 710, the UE may transmit uplink signaling on physical uplink channels (e.g., PUCCH transmissions or PUSCH transmissions) while maintaining phase continuity within a bundle 705. The base station may configure time domain windows at a UE via higher layer signaling (e.g., RRC signaling), dynamic signaling (e.g., DCI signaling), or the UE may implicitly determine the time domain windows based on uplink repetition transmissions configurations. Each time domain window may be the same size (e.g., have the same value for K). For instance, as illustrated with reference to FIG. 7, the time domain windows may have a K value of 8.

The base station may also configure the UE with resource allocation information. For example, the UE may be configured with a TDM configuration. An illustrative example pattern may be: DDDSUDDSUU. Such a pattern may repeat itself over time (e.g., across various TTIs).

The base station may transmit, to the UE, a control message identifying a configuration for the UE to use to transmit repetitions on the physical uplink channel. The physical uplink channel may be associated with one or more DMRSs, which the base station may use to demodulate the repetitions of the uplink message. The UE may determine the time domain windows 710 based on the control message, the TTI format information, one or more rules, or any combination thereof. In some examples, the base station may transmit, to the UE, an indication of the one or more rules. In some examples the rules may be preconfigured at the UE or standardized.

A UE may perform uplink repetitions (e.g., PUCCH repetitions or PUSCH repetitions) in available U TTIs (or available U TTIs and S TTIs). For instance, the UE may transmit repetition zero (e.g., an initial uplink transmission) in slot 4, repetition 1 in slot 8, repetition 2 in slot 9, repetition 3 in slot 14, repetition 18 in slot 4, repetition 5 in slot 19, repetition 6 in slot 24, etc.

In some examples, the UE may perform beam sweeping within or across various time domain windows 710. For instance (e.g., in cases where frequency hopping is not enabled), beam sweeping for physical uplink channel transmissions may depend on a time domain window index. Each time domain window 710 may be associated with a time domain window index. The base station may transmit, to the UE, an indication of time domain window indices, or the UE may determine a time domain window index for each time domain window 710 based on control signaling, TTI format information, or the like.

In some examples (e.g., according to a first beam mapping scheme), all physical uplink channel transmissions within a time domain within may use the same transmission beam. For example, the UE may transmit an uplink message on the physical uplink channel (e.g., a PUCCH or a PUSCH) in slot 4, may transmit a first repetition of the uplink message in slot 8, and a second repetition of the uplink message in slot 9. Because slots 4, 8, and 9 are located in the same time domain window 710-a, the UE may transmit the initial instance of the uplink message and the first and second repetitions using the first beam 715-a. The UE may transmit a third repetition of the uplink message in slot 14, a fourth repetition of the uplink message in slot 18, and a fifth repetition of the uplink message in slot 18. Because slots 14, 18, and 19 are located in the same time domain window 710-b, the UE may transmit the third, fourth, and fifth repetitions of the uplink message using the second beam 715-b. Each time domain window index may correspond to a beam 715, and the UE may transmit each repetition within a time domain window 710 using the beam 715 associated with that time domain window 710, regardless of whether the UE can maintain phase continuity across repetitions within the time domain window 710. For instance, the UE may be able to maintain phase continuity for the first repetition and the second repetition in bundle 705 (e.g., the first repetition and the second repetition may be referred to as coherent transmissions). However, the UE may not be able to maintain phase continuity between slot 4 and slot 8 (e.g., the initial instance of the uplink transmission in slot 4 may be referred to as non-coherent with the first repetition in slot 8. Regardless of phase continuity within time domain window 710-a, the UE may transmit in slot 4, slot 8, and slot 9, using the first beam 715-a.

In some examples (e.g., according to a second beam mapping scheme), coherent physical uplink channel transmissions within a time domain within may use the same transmission beam, and non-coherent physical uplink transmission in the same time domain window 710 may use a different transmission beam. For example, the UE may transmit an uplink message on the physical uplink channel (e.g., a PUCCH or a PUSCH) in slot 4, may transmit a first repetition of the uplink message in slot 8, and a second repetition of the uplink message in slot 9. The UE may maintain phase continuity (e.g., based on one or more phase continuity rules or requirements) between in slots 8 and 9, but may not be able to maintain phase continuity between slots 4 and 8. Because transmissions in slots 8 and 9 are coherent, but transmissions in slot 4 are not coherent with transmissions in slots 8 and 8, the UE may transmit the initial instance of the uplink message using first beam 715-a, and may transmit the first and second repetitions of the uplink message in slots 8 and 9 using the second beam 715-b. Similarly, the UE may transmit the third repetition of the uplink message in slot 14 using the first beam 715-a, and may transmit the fourth and fifth repetitions of the uplink message in slots 18 and 19 using second beam 715-b.

The UE may also transmit DMRSs associated with the physical uplink channel in at least some of the TTIs. For example, the UE may perform DMRS bundling (e.g., may enable joint channel estimation) during slots 8 and 9 (e.g., may maintain phase continuity and may transmit DMRSs only in slot 8 or with different densities in slots 8 and 9). The UE may transmit DMRSs while maintaining phase continuity in coherent TTIs, and may transmit DMRSs using the same beam 715 as it uses to transmit repetitions of the uplink message. For example, the UE may transmit DMRSs in slot 4 using the first beam 715-a and may transmit DMRSs (e.g., at different densities as described with reference to FIGS. 2 and 3) in slots 8 and 9 using the second beam 715-b.

In some examples, the UE may perform beam sweeping and joint channel estimation based on a repetition transmission occasion index (e.g., instead of a time domain window index), as described in greater detail with reference to FIG. 8.

Figure 8:
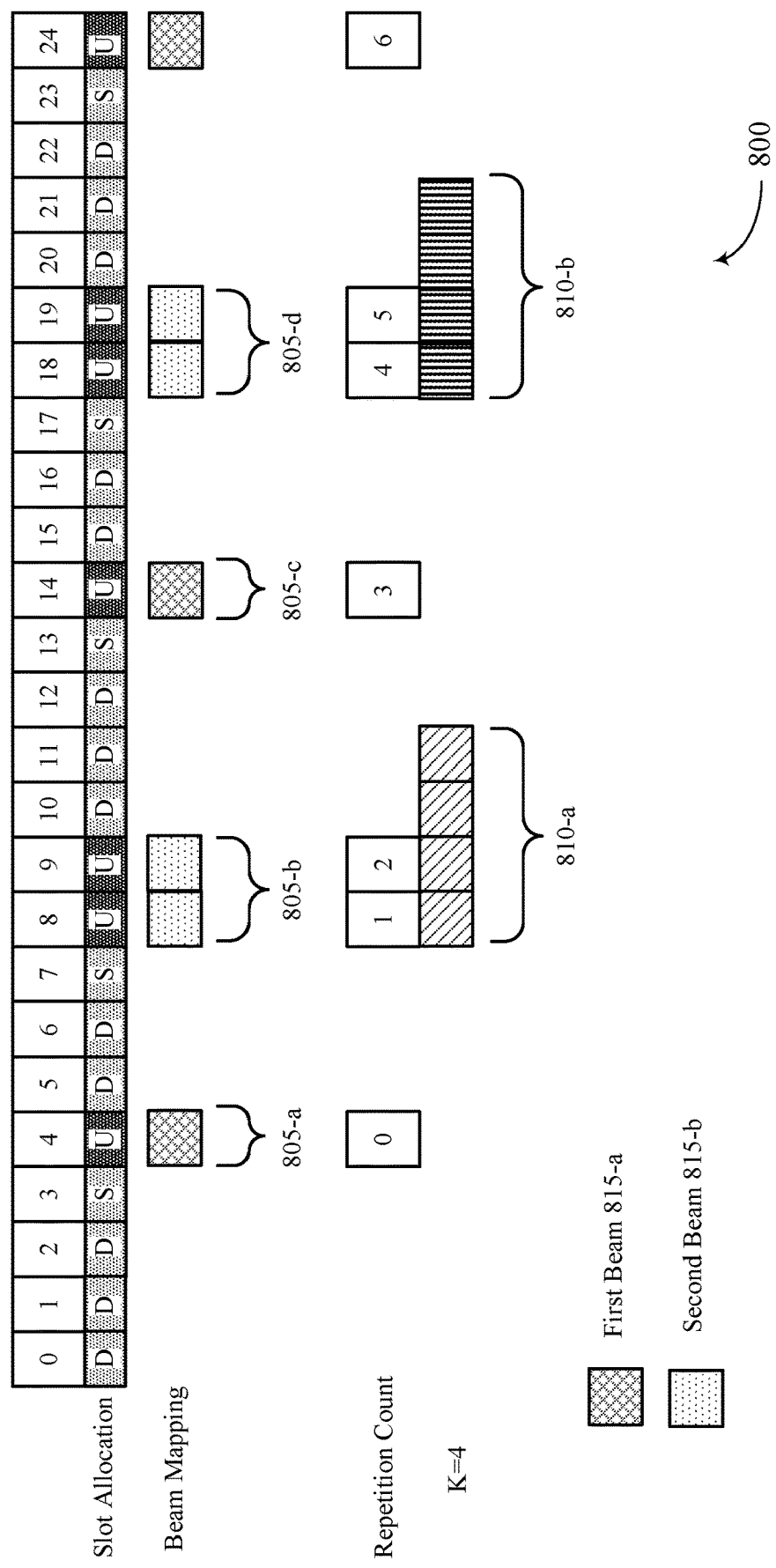
FIG. 8 illustrates an example of a joint channel estimation scheme that supports uplink demodulation reference signal bundling with beam sweeping in accordance with aspects of the present disclosure.

FIG. 8 illustrates an example of a joint channel estimation scheme 800 that supports uplink demodulation reference signal bundling with beam sweeping in accordance with aspects of the present disclosure. Joint channel estimation scheme 800 may be implemented by, or implement aspects of, one or more wireless devices, such as a base station and a UE, which may be examples of corresponding devices described with reference to FIGS. 1-7.

In some examples, a base station may configure the UE with one or more time domain windows 810, as described with reference to FIGS. 3 and 7. Each time domain window may be the same size (e.g., have the same value for K). For instance, as illustrated with reference to FIG. 8, the time domain windows may have a K value of 4. As described in greater detail with reference to FIG. 3, each time domain window 810 may include coherent TTIs (e.g., TTIs in which the UE can maintain phase continuity). For instance, time domain window 810-a may include slot 8 and slot 9 (e.g., which are coherent), but may not include slot 4 (e.g., which is not coherent with slots 8 and 9).

The UE may determine one or more repetition transmission occasions 805 for transmitting repetitions on a physical uplink channel (e.g., a PUCCH or PUSCH). The base station may configure the UE with a set of repetition transmission occasions 805 and a set of repetition transmission occasion indices, or may transmit control signaling for the UE to determine the repetition transmission occasions 805 and repetition transmission occasion indices, or any combination thereof. Because time domain windows 810 include coherent TTIs (but not all TTIs allocated for uplink transmissions), some repetition transmission occasions 805 may be located in time domain windows 810, and others may be located outside of time domain windows 810.

Beam sweeping for physical uplink channel repetition and joint channel estimation may be based on repetition transmission occasion indices. In some examples, each repetition transmission occasion 805 may be associated with a beam 815 (e.g., a subset of repetition transmission occasion indices may be associated with first beam 815-a and a second subset of repetition transmission occasion indices may be associated with second beam 815-b). For example, the UE may transmit an uplink message in slot 4 using first beam 815-a. The UE may transmit first and second repetition of the uplink message in slots 8 and 9 (e.g., maintaining phase continuity) using second beam 815-b. Similarly, the UE may transmit a third repetition of the uplink message in slot 14 using the first beam 815-a, and may transmit fourth and fifth repetitions of the uplink message in slots 18 and 19 (e.g., maintaining phase continuity) using the second beam 815-b. The UE may select which beam 815 to use during a repetition transmission occasion based on which transmit beam 815 is associated with the repetition transmission occasion index of that repetition transmission occasion 805 (e.g., or may alternate or cycle through a set of available beams 815 in order of repetition transmission occasions 805).

The UE may also transmit DMRSs associated with the physical uplink channel in at least some of the TTIs. For example, the UE may perform DMRS bundling (e.g., may enable joint channel estimation) during slots 8 and 9 (e.g., may maintain phase continuity and may transmit DMRSs only in slot 8 or with different densities in slots 8 and 9). The UE may transmit DMRSs while maintaining phase continuity in coherent TTIs, and may transmit DMRSs using the same beam 815 as it uses to transmit repetitions of the uplink message. For example, the UE may transmit DMRSs in slot 4 using the first beam 815-a and may transmit DMRSs (e.g., at different densities as described with reference to FIGS. 2 and 3) in slots 8 and 9 using the second beam 815-b.

In some examples, the UE may perform beam sweeping and joint channel estimation procedures across different time domain windows 810 based on a beam multiplexing pattern, as described in greater detail with reference to FIG. 9.

Figure 9:
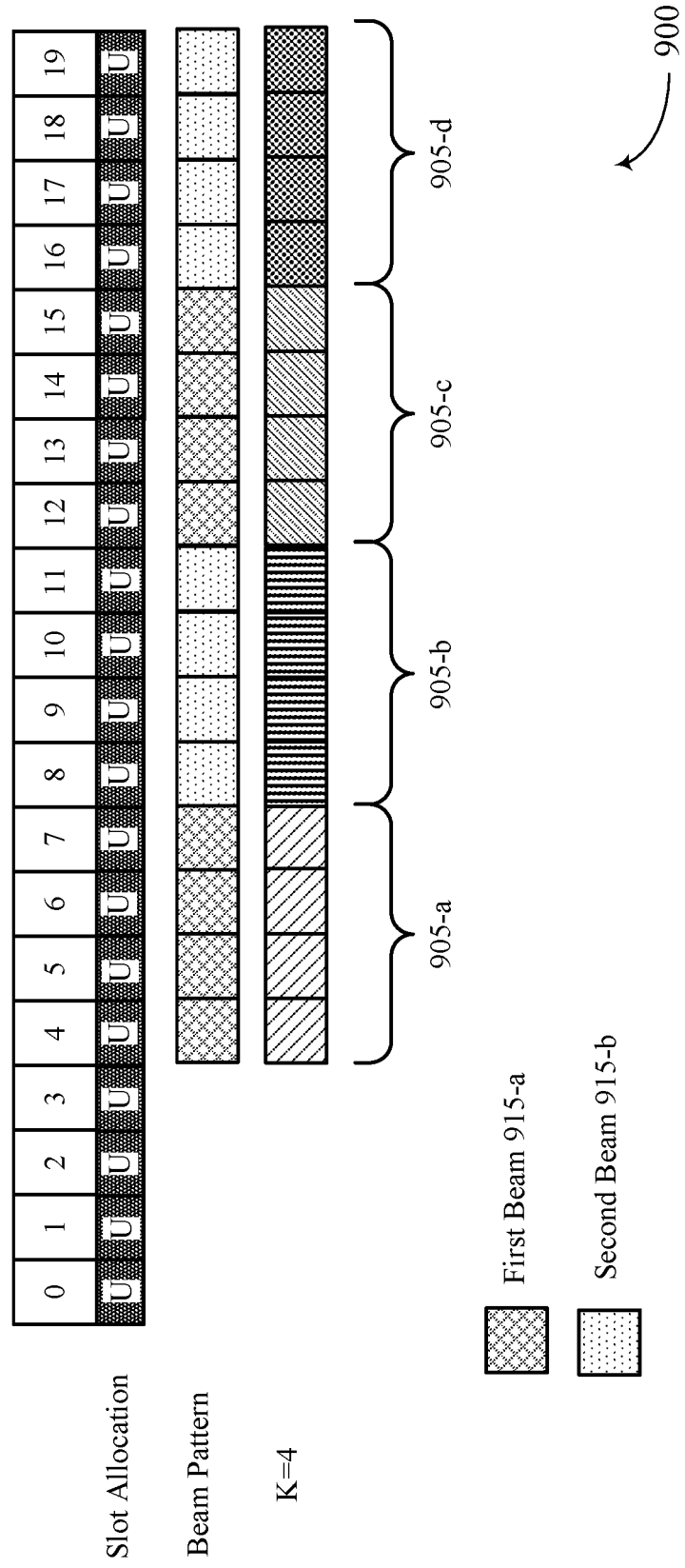
FIG. 9 illustrates an example of a joint channel estimation scheme that supports uplink demodulation reference signal bundling with beam sweeping in accordance with aspects of the present disclosure.

FIG. 9 illustrates an example of a joint channel estimation scheme 900 that supports uplink demodulation reference signal bundling with beam sweeping in accordance with aspects of the present disclosure. Joint channel estimation scheme 900 may be implemented by, or implement aspects of, one or more wireless devices, such as a base station and a UE, which may be examples of corresponding devices described with reference to FIGS. 1-8.

In some examples, the base station may configure the UE to transmit one or more physical uplink channel repetitions. The base station may also configure the UE with a TTI format (e.g., slots 0-19 allocated for uplink signaling).

Beam multiplexing patterns across time domain windows may depend on time domain window indices. Different subsets of time domain window indices may be associated with different beams 915. For example, the base station may transmit control signaling to the UE, and the UE may determine time domain windows 95 based on the control signaling, the TTI format, or any combination thereof. In some examples (e.g., based on one or more rules, or an indication from the base station), a first subset of time domain window indices (e.g., even indices) for the time domain windows 905 may be associated with first beam 915-a, and a second subset of time domain window indices (e.g., odd indices) for the time domain windows 905 may be associated with second beam 915-b. For instance, time domain window 905-a may have a time domain window index 0, time domain window 905-b may have a time domain window index 1, time domain window 905-c may have a time domain window index 2, and time domain window 905-d may have a time domain window index 3. Thus, time domain window 905-a and time domain window 905-c may be associated with first beam 915-a, and time domain window 905-b and time domain window 905-d may be associated with second beam 915-b. In such examples, the UE may transmit uplink repetitions during time domain window 905-a and time domain window 905-c using first beam 915-a, and may transmit uplink repetitions during time domain window 905-b and time domain window 905-d using second beam 915-b.

In some examples, the base station may enable frequency hopping, and the UE may determine a beam sweeping and frequency hopping pattern for joint channel estimation and physical uplink channel repetition based at least in part on the frequency hopping, as described in greater detail with reference to FIG. 10.

Figure 10:
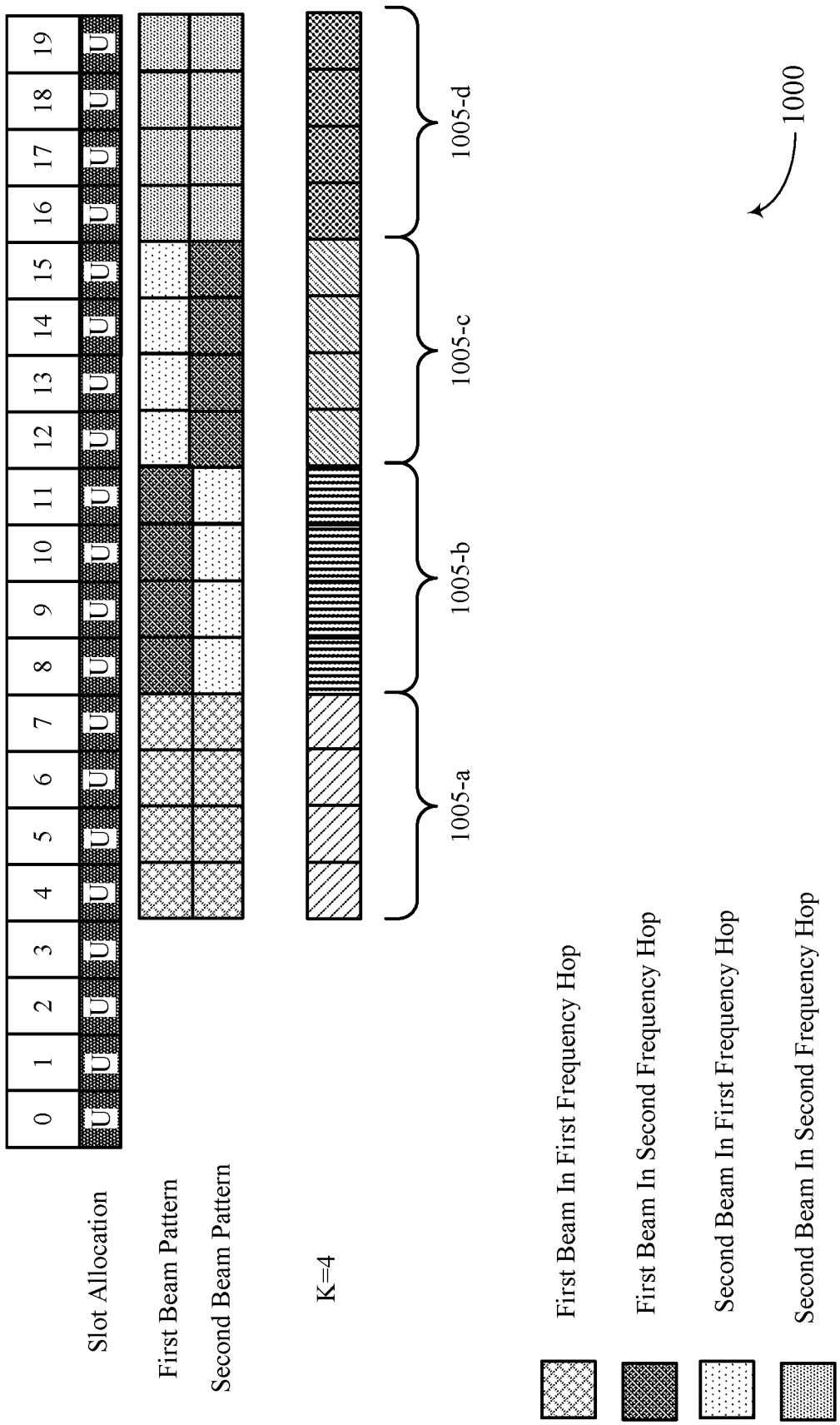
FIG. 10 illustrates an example of a joint channel estimation scheme that supports uplink demodulation reference signal bundling with beam sweeping in accordance with aspects of the present disclosure.

FIG. 10 illustrates an example of a joint channel estimation scheme 1000 that supports uplink demodulation reference signal bundling with beam sweeping in accordance with aspects of the present disclosure. Joint channel estimation scheme 1000 may be implemented by, or implement aspects of, one or more wireless devices, such as a base station and a UE, which may be examples of corresponding devices described with reference to FIGS. 1-9.

The base station may configure the UE with information for the UE to determine the time domain windows 1005. The base station may also configure the UE with a frequency hopping configuration. In some examples, the frequency hopping configuration may include multiple frequency hops (e.g., multiple sets of frequency resources in which to transmit repetitions of uplink messages), a frequency hopping pattern, or any combination thereof. The UE may maintain phase continue for transmitting uplink repetitions and DMRSs during one or more TTIs (e.g., slots) of a time domain window 1005.

The UE may transmit repetitions of uplink messages (e.g., on a PUCCH or a PUSCH) using a single beam for each uplink TTI in a given time domain window 1005. In some examples, the UE may select and use a beam in a particular frequency hop based on a beam multiplexing pattern (e.g., a beam pattern). The UE may determine the beam pattern based on signaling from the base station (e.g., control signaling), based on one or more rules, or any combination thereof.

The beam pattern may be a cyclic beam multiplexing pattern (e.g., first beam pattern), as described with reference to FIG. 6. In such examples, the UE may transmit a number (e.g., two) of hops in a number (e.g., two) of consecutive windows using a first transmission beam, and then may follow up with transmissions in the same number (e.g., two) of frequency hops in the same number (e.g., two) of consecutive time domain windows using the second beam. In such examples, the UE may transmit repetitions of uplink messages, associated DMRSs, or both, during time domain window 1005-a using the first beam in the first frequency hop, may transmit repetitions and associated DMRSs during time domain window 1005-b using the first beam in the second frequency hop, may transmit repetitions and associated DMRSs during time domain window 1005-c using the second beam in the first frequency hop, and may transmit repetitions and associated DMRSs during time domain window 1005-d using the second beam in the second frequency hop.

The beam pattern may be a sequential beam multiplexing pattern (e.g., second beam pattern), as described with reference to FIG. 6. In such examples, the UE may transmit in a first frequency hop using a number (e.g., two) of beams in a number (e.g., two) of consecutive time domain windows 1005, and may then follow up with transmissions in a second frequency hop using the same (e.g., two) beams in the next (e.g., two) consecutive time domain windows 1005. For instance, the UE may transmit uplink repetitions, associated DMRSs, or both, during time domain window 1005-a using the first beam in the first frequency hop, may transmit repetitions and associated DMRSs during time domain window 1005-b using the second beam in the first frequency hop, may transmit repetitions and associated DMRSs during time domain window 1005-c using the first beam in the second frequency hop, and may then transmit repetitions and associated DMRSs during time domain window 1005-d using the second beam in the second frequency hop.

In some examples, the UE may be configurable between the first beam pattern and the second beam pattern. The base station may transmit a control message indicating that the UE is to use the first beam pattern or the second beam pattern. The control message may be dynamic (e.g., via DCI signaling), semi-persistent (e.g., via RRC signaling), or any combination thereof. The control message may indicate the beam patter than the UE is to use for specific time domain windows 1005 (e.g. a number of time domain windows 1005, or a set or subset of time domain window indices, or the like), or may indicate an amount of time that the UE is to use the beam pattern for, or may indicate that the UE is to use the indicated beam pattern until instructed otherwise, or any combination thereof.

Figure 11:
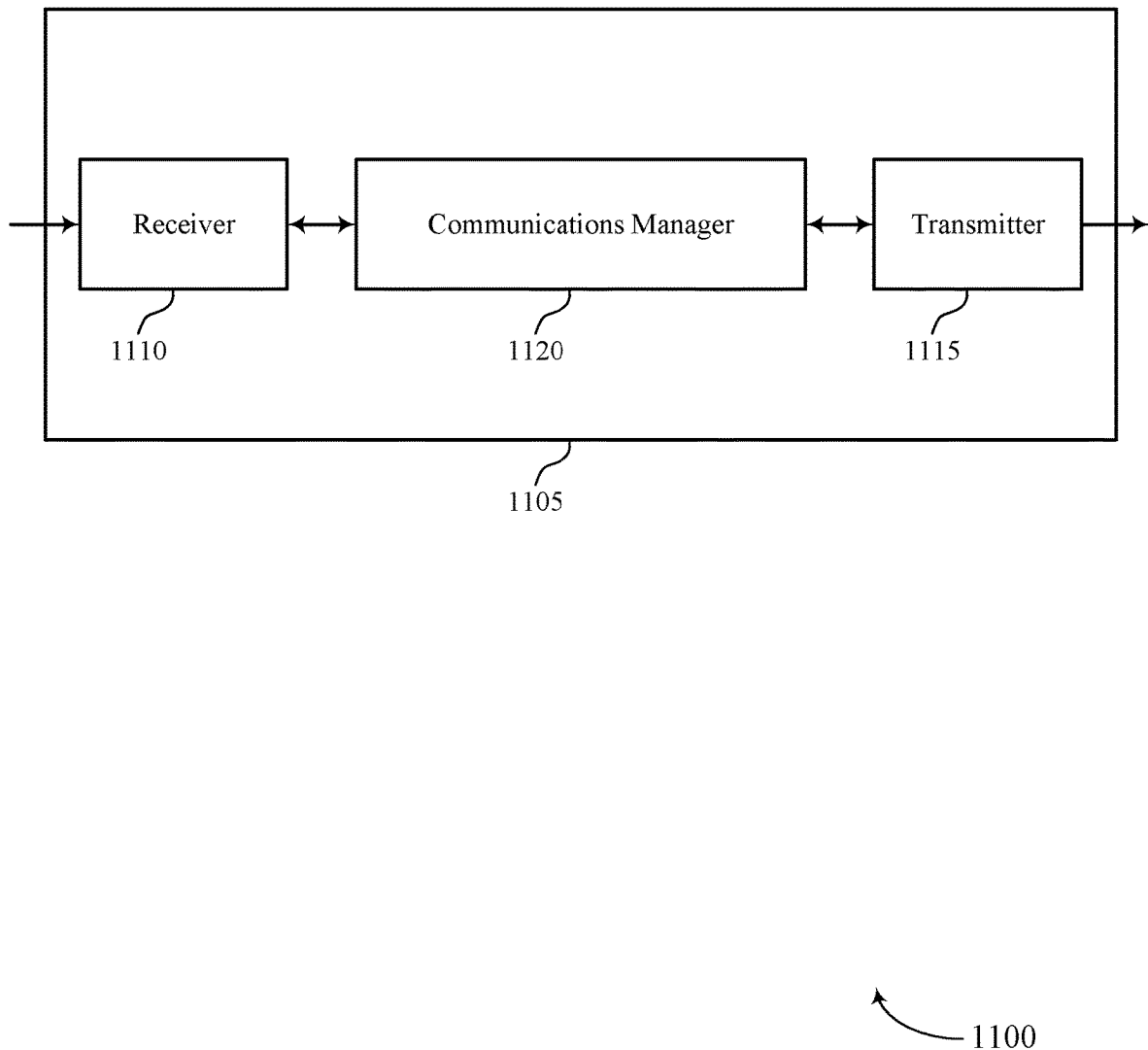
FIGS. 11 and 12 show block diagrams of devices that support uplink demodulation reference signal bundling with beam sweeping in accordance with aspects of the present disclosure.

FIG. 11 shows a block diagram 1100 of a device 1105 that supports uplink demodulation reference signal bundling with beam sweeping in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to uplink demodulation reference signal bundling with beam sweeping). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to uplink demodulation reference signal bundling with beam sweeping). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of uplink demodulation reference signal bundling with beam sweeping as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a user equipment in accordance with examples as disclosed herein. For example, the communications manager 1120 may be configured as or otherwise support a means for receiving, from a base station, a control message identifying a configuration for the UE to transmit a set of multiple repetitions of a physical uplink channel, where the physical uplink channel is associated with a set of multiple demodulation reference signals. The communications manager 1120 may be configured as or otherwise support a means for transmitting, using a first set of spatial transmission parameters associated with the configuration, a first repetition of the physical uplink channel during a first transmission time interval and a second repetition of the physical uplink channel during a second transmission time interval, where the UE maintains phase continuity in the first transmission time interval and the second transmission time interval. The communications manager 1120 may be configured as or otherwise support a means for transmitting, using a second set of spatial transmission parameters associated with the configuration, a third repetition of the physical uplink channel during a third transmission time interval.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for joint channel estimation resulting in more efficient use of available resources, improved reliability of communications, decreased system latency, and improved user experience.

Figure 12:
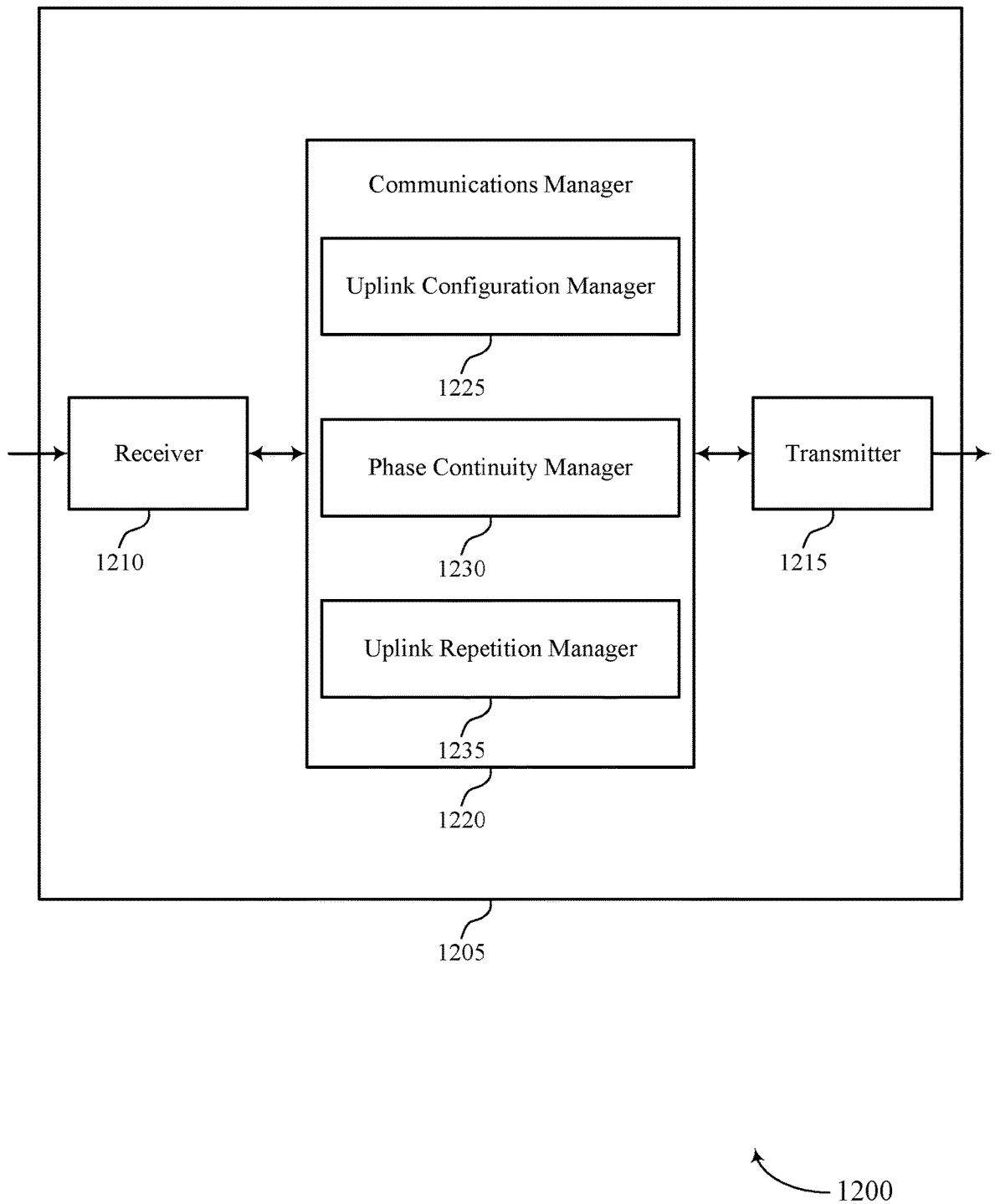

FIG. 12 shows a block diagram 1200 of a device 1205 that supports uplink demodulation reference signal bundling with beam sweeping in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to uplink demodulation reference signal bundling with beam sweeping). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to uplink demodulation reference signal bundling with beam sweeping). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of uplink demodulation reference signal bundling with beam sweeping as described herein. For example, the communications manager 1220 may include an uplink configuration manager 1225, a phase continuity manager 1230, an uplink repetition manager 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a user equipment in accordance with examples as disclosed herein. The uplink configuration manager 1225 may be configured as or otherwise support a means for receiving, from a base station, a control message identifying a configuration for the UE to transmit a set of multiple repetitions of a physical uplink channel, where the physical uplink channel is associated with a set of multiple demodulation reference signals. The phase continuity manager 1230 may be configured as or otherwise support a means for transmitting, using a first set of spatial transmission parameters associated with the configuration, a first repetition of the physical uplink channel during a first transmission time interval and a second repetition of the physical uplink channel during a second transmission time interval, where the UE maintains phase continuity in the first transmission time interval and the second transmission time interval. The uplink repetition manager 1235 may be configured as or otherwise support a means for transmitting, using a second set of spatial transmission parameters associated with the configuration, a third repetition of the physical uplink channel during a third transmission time interval.

Figure 13:
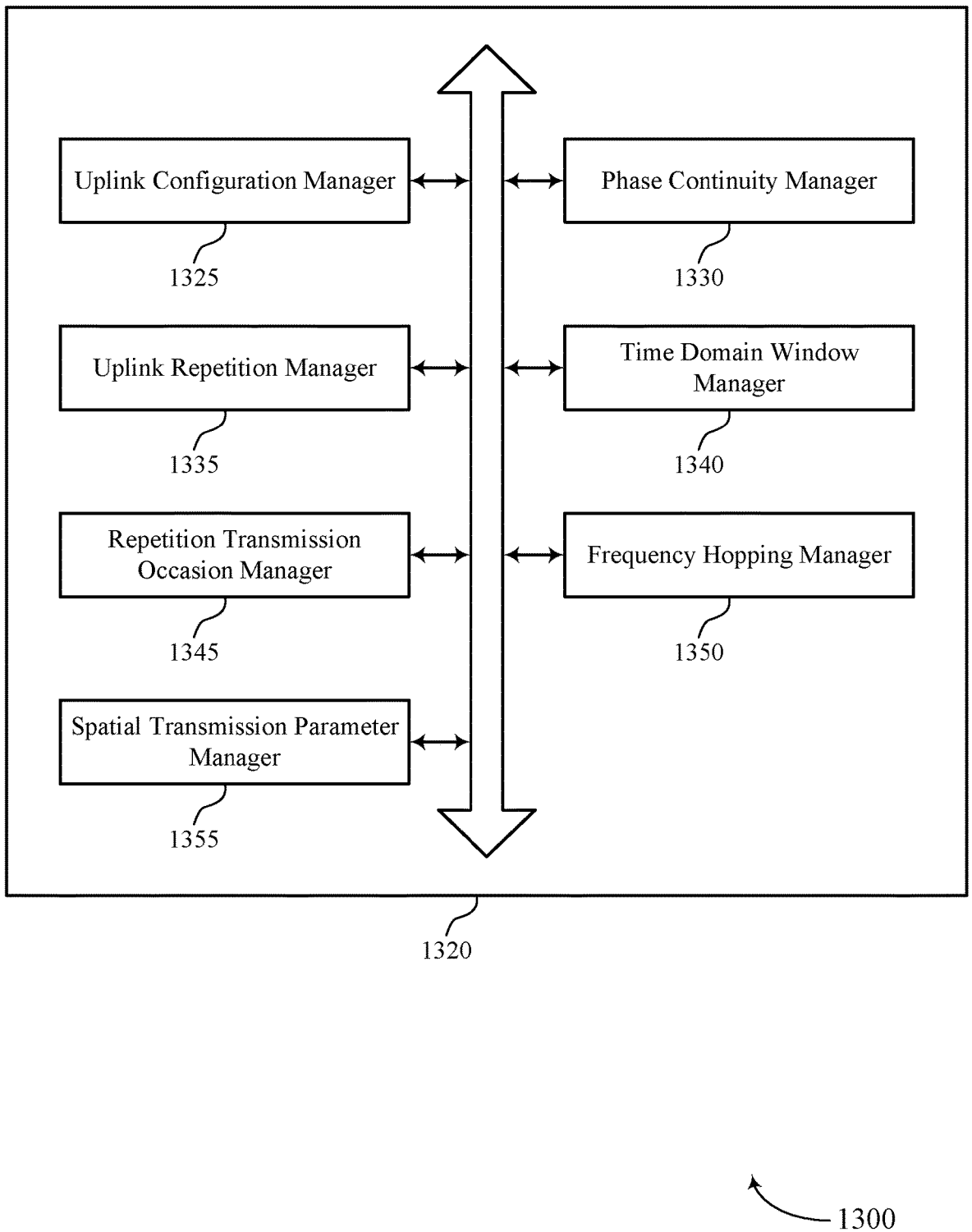
FIG. 13 shows a block diagram of a communications manager that supports uplink demodulation reference signal bundling with beam sweeping in accordance with aspects of the present disclosure.

FIG. 13 shows a block diagram 1300 of a communications manager 1320 that supports uplink demodulation reference signal bundling with beam sweeping in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of uplink demodulation reference signal bundling with beam sweeping as described herein. For example, the communications manager 1320 may include an uplink configuration manager 1325, a phase continuity manager 1330, an uplink repetition manager 1335, a time domain window manager 1340, a repetition transmission occasion manager 1345, a frequency hopping manager 1350, a spatial transmission parameter manager 1355, or any combination thereof. Each of these components may communicate, directly or indirectly, with one another (e.g., via one or more buses).

The communications manager 1320 may support wireless communications at a user equipment in accordance with examples as disclosed herein. The uplink configuration manager 1325 may be configured as or otherwise support a means for receiving, from a base station, a control message identifying a configuration for the UE to transmit a set of multiple repetitions of a physical uplink channel, where the physical uplink channel is associated with a set of multiple demodulation reference signals. The phase continuity manager 1330 may be configured as or otherwise support a means for transmitting, using a first set of spatial transmission parameters associated with the configuration, a first repetition of the physical uplink channel during a first transmission time interval and a second repetition of the physical uplink channel during a second transmission time interval, where the UE maintains phase continuity in the first transmission time interval and the second transmission time interval. The uplink repetition manager 1335 may be configured as or otherwise support a means for transmitting, using a second set of spatial transmission parameters associated with the configuration, a third repetition of the physical uplink channel during a third transmission time interval.

In some examples, the time domain window manager 1340 may be configured as or otherwise support a means for receiving, from the base station, configuration information for the UE to determine a set of multiple time domain windows for joint channel estimation, each time domain window associated with a time domain window index of a set of time domain window indices, and a spatial transmission parameter pattern indicating a first subset of the time domain window indices corresponding to the first set of spatial transmission parameters and a second subset of the time domain window indices corresponding to the second set of spatial transmission parameters.

In some examples, the phase continuity manager 1330 may be configured as or otherwise support a means for maintaining phase continuity of the first repetition of the physical uplink channel and the second repetition of the physical uplink channel in the first transmission time interval and the second transmission time interval according to one or more phase continuity requirements, where the first transmission time interval and the second transmission time interval are located in a first time domain window of the set of multiple time domain windows corresponding to one of the first subset of the time domain window indices.

In some examples, the third transmission time interval is located in a second time domain window corresponding to one of the second subset of the time domain window indices.

In some examples, the spatial transmission parameter manager 1355 may be configured as or otherwise support a means for transmitting, based on the spatial transmission parameter pattern, a fourth repetition of the physical uplink channel using the first set of spatial transmission parameters during a fourth transmission time interval located in the first time domain window, where the UE is not capable of maintaining phase continuity in the fourth transmission time interval and at least one of the first transmission time interval or the second transmission time interval.

In some examples, the third transmission time interval is located in the first time domain window corresponding to one of the first subset of the time domain window indices.

In some examples, the phase continuity manager 1330 may be configured as or otherwise support a means for determining that the UE is capable of maintaining phase continuity in the first transmission time interval and the second transmission time interval, and that the UE is not capable of maintaining phase continuity in the third transmission time interval and at least one of the first transmission time interval or the second transmission time interval, where maintaining phase continuity in the first transmission time interval and the second transmission time interval is based on the determining.

In some examples, the repetition transmission occasion manager 1345 may be configured as or otherwise support a means for receiving, from the base station, configuration information for the UE to determine a set of multiple repetition transmission occasions, at least some of the repetition transmission occasions associated with time domain windows during which the UE is capable of maintaining phase continuity for joint channel estimation, each repetition transmission occasion associated with a repetition transmission occasion index of a set of repetition transmission occasion indices, and a spatial transmission parameter pattern indicating a first subset of the repetition transmission occasion indices corresponding to the first set of spatial transmission parameters and a second subset of the repetition transmission occasion indices corresponding to the second set of spatial transmission parameters.

In some examples, the phase continuity manager 1330 may be configured as or otherwise support a means for maintaining phase continuity of the first repetition of the physical uplink channel and the second repetition of the physical uplink channel in the first transmission time interval and the second transmission time interval according to one or more phase continuity requirements, where the first transmission time interval and the second transmission time interval are located in a first repetition transmission occasion corresponding to one of the first subset of the time domain window indices. In some examples, the repetition transmission occasion manager 1345 may be configured as or otherwise support a means for where the third transmission time interval is located in a second repetition transmission occasion corresponding to one of the second subset of the repetition transmission occasion indices.

In some examples, the repetition transmission occasion manager 1345 may be configured as or otherwise support a means for determining that the UE is capable of maintaining phase continuity in the first transmission time interval and the second transmission time interval, and that the UE is not capable of maintaining phase continuity in the third transmission time interval and at least one of the first transmission time interval or the second transmission time interval, where maintaining phase continuity in the first transmission time interval and the second transmission time interval is based on the determining.

In some examples, the frequency hopping manager 1350 may be configured as or otherwise support a means for receiving, from the base station, configuration information for the UE to determine a set of multiple time domain windows for joint channel estimation, a frequency hopping configuration, a spatial transmission parameter pattern, or any combination thereof. In some examples, the phase continuity manager 1330 may be configured as or otherwise support a means for maintaining phase continuity of the first repetition of the physical uplink channel and the second repetition of the physical uplink channel in the first transmission time interval and the second transmission time interval according to one or more phase continuity requirements. In some examples, the phase continuity manager 1330 may be configured as or otherwise support a means for maintaining phase continuity of the third repetition of the physical uplink channel and a fourth repetition of the uplink physical channel in the third transmission time interval and a fourth transmission time interval according to the one or more phase continuity requirements, where the fourth repetition of the physical uplink channel is transmitted during the fourth transmission time interval using the second set of spatial transmission parameters. In some examples, the phase continuity manager 1330 may be configured as or otherwise support a means for maintaining phase continuity of a first set of one or more additional repetitions of the physical uplink channel in a fifth transmission time interval and a sixth transmission time interval according to the one or more phase continuity requirements, where the first set of one or more additional repetitions of the physical uplink channel are transmitted during the fifth transmission time interval and the sixth transmission time interval using the first set of spatial transmission parameters. In some examples, the phase continuity manager 1330 may be configured as or otherwise support a means for maintaining phase continuity of a second set of one or more additional repetitions of the physical uplink channel in a seventh transmission time interval and an eighth transmission time interval according to the one or more phase continuity requirements, where the second set of one or more additional repetitions of the physical uplink channel are transmitted during the seventh transmission time interval and the eighth transmission time interval using the second set of spatial transmission parameters.

In some examples, the first transmission time interval and the second transmission time interval are located in a first time domain window. In some examples, the third transmission time interval and the fourth transmission time interval are located in a second time domain window. In some examples, the fifth transmission time interval and the sixth transmission time interval are located in a third time domain window. In some examples, the seventh transmission time interval and the eighth transmission time interval are located in a fourth time domain window.

In some examples, the frequency hopping manager 1350 may be configured as or otherwise support a means for selecting, based on the frequency hopping configuration including a cyclic frequency hopping configuration, a first set of frequency resources for transmissions during the first time domain window and the second time domain window, and a second set of frequency resources for transmissions during the third time domain window and the fourth time domain window, where the first time domain window precedes the third time domain window, the third time domain window precedes the second time domain window, and the second time domain window precedes the fourth time domain window in time.

In some examples, the frequency hopping manager 1350 may be configured as or otherwise support a means for selecting, based on the frequency hopping configuration including a sequential frequency hopping configuration, a first set of frequency resources for transmissions during the first time domain window and the third time domain window and a second set of frequency resources for transmissions during the second time domain window and the fourth time domain window, where the first time domain window and the second time domain window precedes the third time domain window and the fourth time domain window in time.

In some examples, the spatial transmission parameters of the first set of spatial transmission parameters and the second set of spatial transmission parameters include one or more beam configurations, one or more antenna port configurations, one or more spatial domain transmission filters, one or more spatial relations, or any combination thereof.

In some examples, the first set of spatial transmission parameters is directed toward a first wireless device. In some examples, the second set of spatial transmission parameters is directed toward a second wireless device.

In some examples, the physical uplink channel includes a physical uplink control channel or a physical uplink shared channel.

Figure 14:
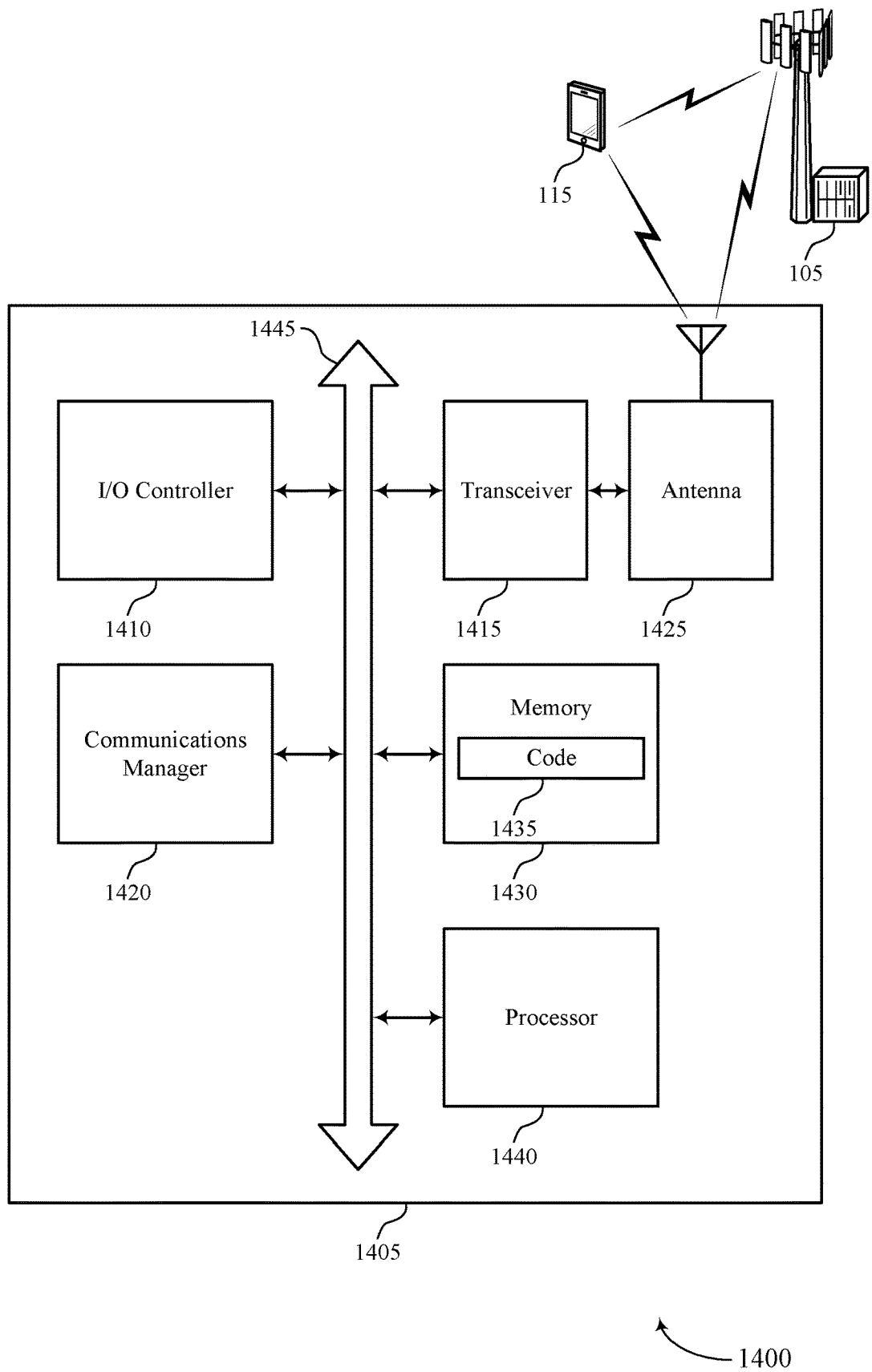
FIG. 14 shows a diagram of a system including a device that supports uplink demodulation reference signal bundling with beam sweeping in accordance with aspects of the present disclosure.

FIG. 14 shows a diagram of a system 1400 including a device 1405 that supports uplink demodulation reference signal bundling with beam sweeping in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting uplink demodulation reference signal bundling with beam sweeping). For example, the device 1405 or a component of the device 1405 may include a processor 1440 and memory 1430 coupled to the processor 1440, the processor 1440 and memory 1430 configured to perform various functions described herein.

The communications manager 1420 may support wireless communications at a user equipment in accordance with examples as disclosed herein. For example, the communications manager 1420 may be configured as or otherwise support a means for receiving, from a base station, a control message identifying a configuration for the UE to transmit a set of multiple repetitions of a physical uplink channel, where the physical uplink channel is associated with a set of multiple demodulation reference signals. The communications manager 1420 may be configured as or otherwise support a means for transmitting, using a first set of spatial transmission parameters associated with the configuration, a first repetition of the physical uplink channel during a first transmission time interval and a second repetition of the physical uplink channel during a second transmission time interval, where the UE maintains phase continuity in the first transmission time interval and the second transmission time interval. The communications manager 1420 may be configured as or otherwise support a means for transmitting, using a second set of spatial transmission parameters associated with the configuration, a third repetition of the physical uplink channel during a third transmission time interval.

By including or configuring the communications manager 1420 in accordance with examples as described herein, the device 1405 may support techniques for joint channel estimation resulting in more efficient use of available resources, improved reliability of communications, decreased system latency, and improved user experience.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of uplink demodulation reference signal bundling with beam sweeping as described herein, or the processor 1440 and the memory 1430 may be otherwise configured to perform or support such operations.

Figure 15:
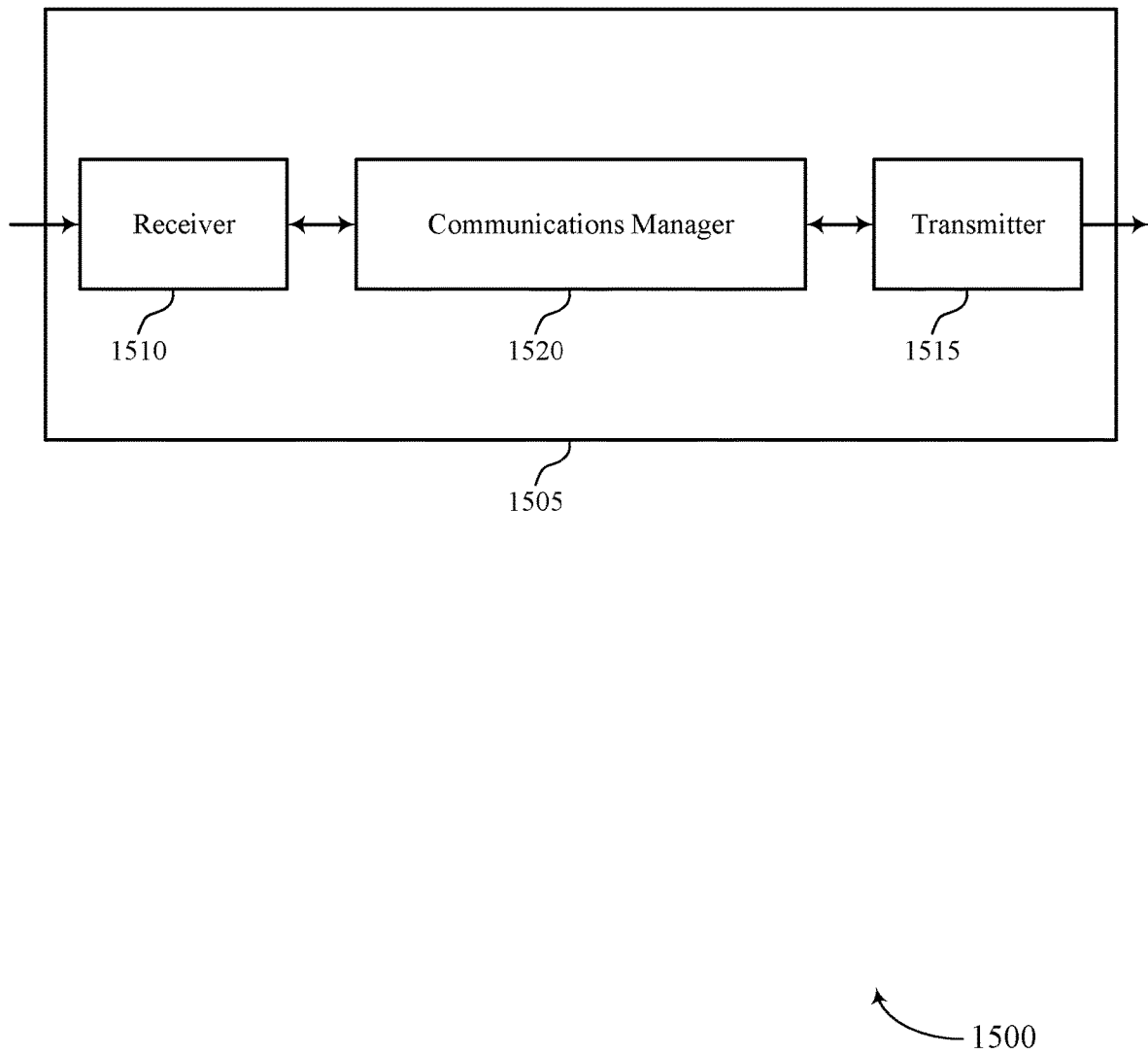
FIGS. 15 and 16 show block diagrams of devices that support uplink demodulation reference signal bundling with beam sweeping in accordance with aspects of the present disclosure.

FIG. 15 shows a block diagram 1500 of a device 1505 that supports uplink demodulation reference signal bundling with beam sweeping in accordance with aspects of the present disclosure. The device 1505 may be an example of aspects of a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to uplink demodulation reference signal bundling with beam sweeping). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to uplink demodulation reference signal bundling with beam sweeping). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of uplink demodulation reference signal bundling with beam sweeping as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communications at first base station in accordance with examples as disclosed herein. For example, the communications manager 1520 may be configured as or otherwise support a means for transmitting, to a UE, a control message identifying a configuration for the UE to transmit a set of multiple repetitions of a physical uplink channel using a first set of spatial transmission parameters directed toward the base station and a second set of spatial transmission parameters directed toward a second base station. The communications manager 1520 may be configured as or otherwise support a means for receiving, from the UE using the first set of spatial transmission parameters associated with the configuration, a first set of multiple demodulation reference signals associated with the physical uplink channel during at least one of a first transmission time interval or a second transmission time interval. The communications manager 1520 may be configured as or otherwise support a means for performing a joint channel estimation procedure in the first transmission time interval and the second transmission time interval based on receiving the first set of multiple demodulation reference signals, where phase continuity is maintained in the first transmission time interval and the second transmission time interval. The communications manager 1520 may be configured as or otherwise support a means for receiving, from the UE using the first set of spatial transmission parameters associated with the configuration based on the joint channel estimation procedure, a first repetition of the physical uplink channel during the first transmission time interval, and a second repetition of the physical uplink channel during the second transmission time interval.

By including or configuring the communications manager 1520 in accordance with examples as described herein, the device 1505 (e.g., a processor controlling or otherwise coupled to the receiver 1510, the transmitter 1515, the communications manager 1520, or a combination thereof) may support techniques for joint channel estimation resulting in more efficient use of available resources, improved reliability of communications, decreased system latency, and improved user experience.

Figure 16:
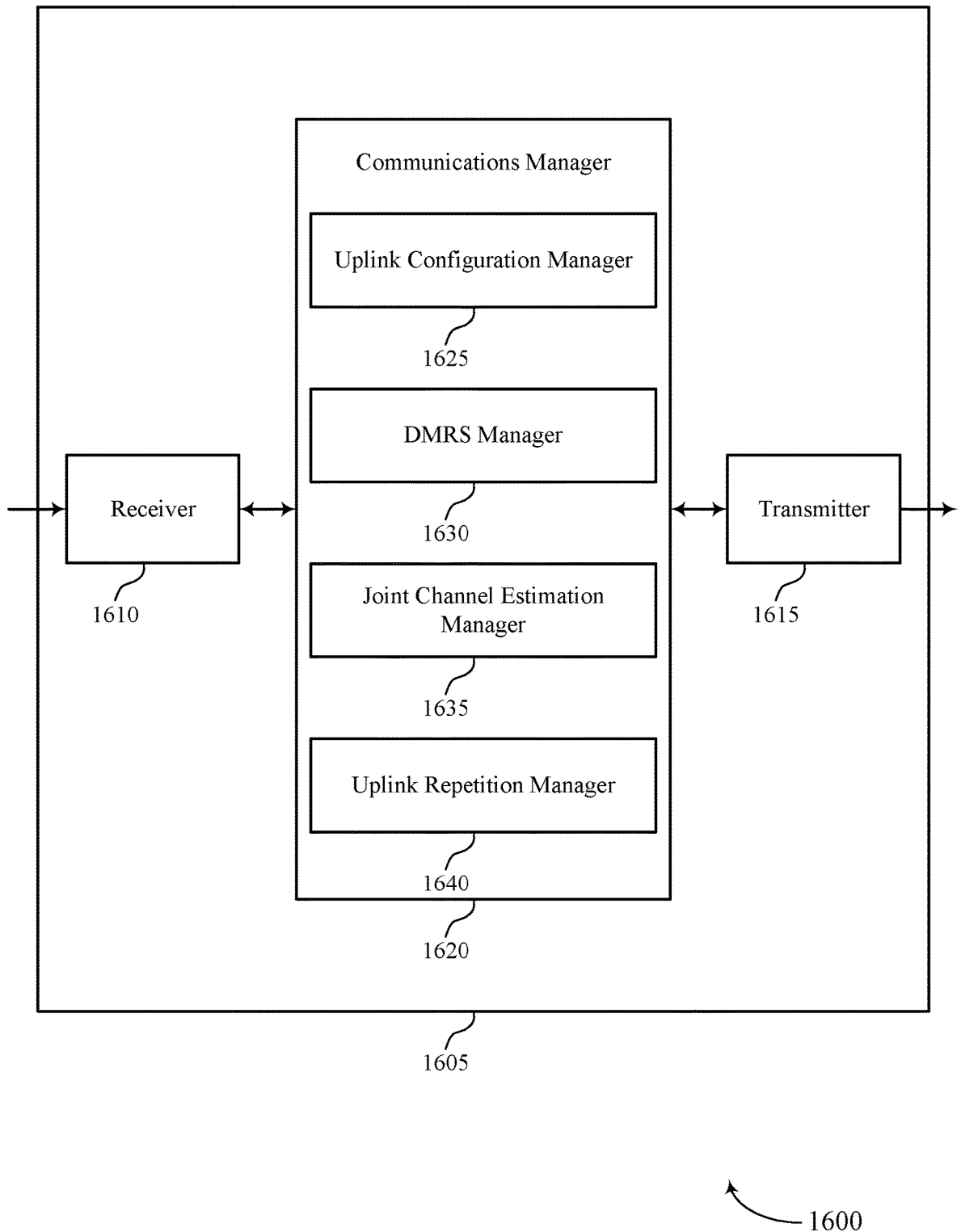

FIG. 16 shows a block diagram 1600 of a device 1605 that supports uplink demodulation reference signal bundling with beam sweeping in accordance with aspects of the present disclosure. The device 1605 may be an example of aspects of a device 1505 or a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to uplink demodulation reference signal bundling with beam sweeping). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to uplink demodulation reference signal bundling with beam sweeping). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of uplink demodulation reference signal bundling with beam sweeping as described herein. For example, the communications manager 1620 may include an uplink configuration manager 1625, a DMRS manager 1630, a joint channel estimation manager 1635, an uplink repetition manager 1640, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communications at first base station in accordance with examples as disclosed herein. The uplink configuration manager 1625 may be configured as or otherwise support a means for transmitting, to a UE, a control message identifying a configuration for the UE to transmit a set of multiple repetitions of a physical uplink channel using a first set of spatial transmission parameters directed toward the base station and a second set of spatial transmission parameters directed toward a second base station. The DMRS manager 1630 may be configured as or otherwise support a means for receiving, from the UE using the first set of spatial transmission parameters associated with the configuration, a first set of multiple demodulation reference signals associated with the physical uplink channel during at least one of a first transmission time interval or a second transmission time interval. The joint channel estimation manager 1635 may be configured as or otherwise support a means for performing a joint channel estimation procedure in the first transmission time interval and the second transmission time interval based on receiving the first set of multiple demodulation reference signals, where phase continuity is maintained in the first transmission time interval and the second transmission time interval. The uplink repetition manager 1640 may be configured as or otherwise support a means for receiving, from the UE using the first set of spatial transmission parameters associated with the configuration based on the joint channel estimation procedure, a first repetition of the physical uplink channel during the first transmission time interval, and a second repetition of the physical uplink channel during the second transmission time interval.

Figure 17:
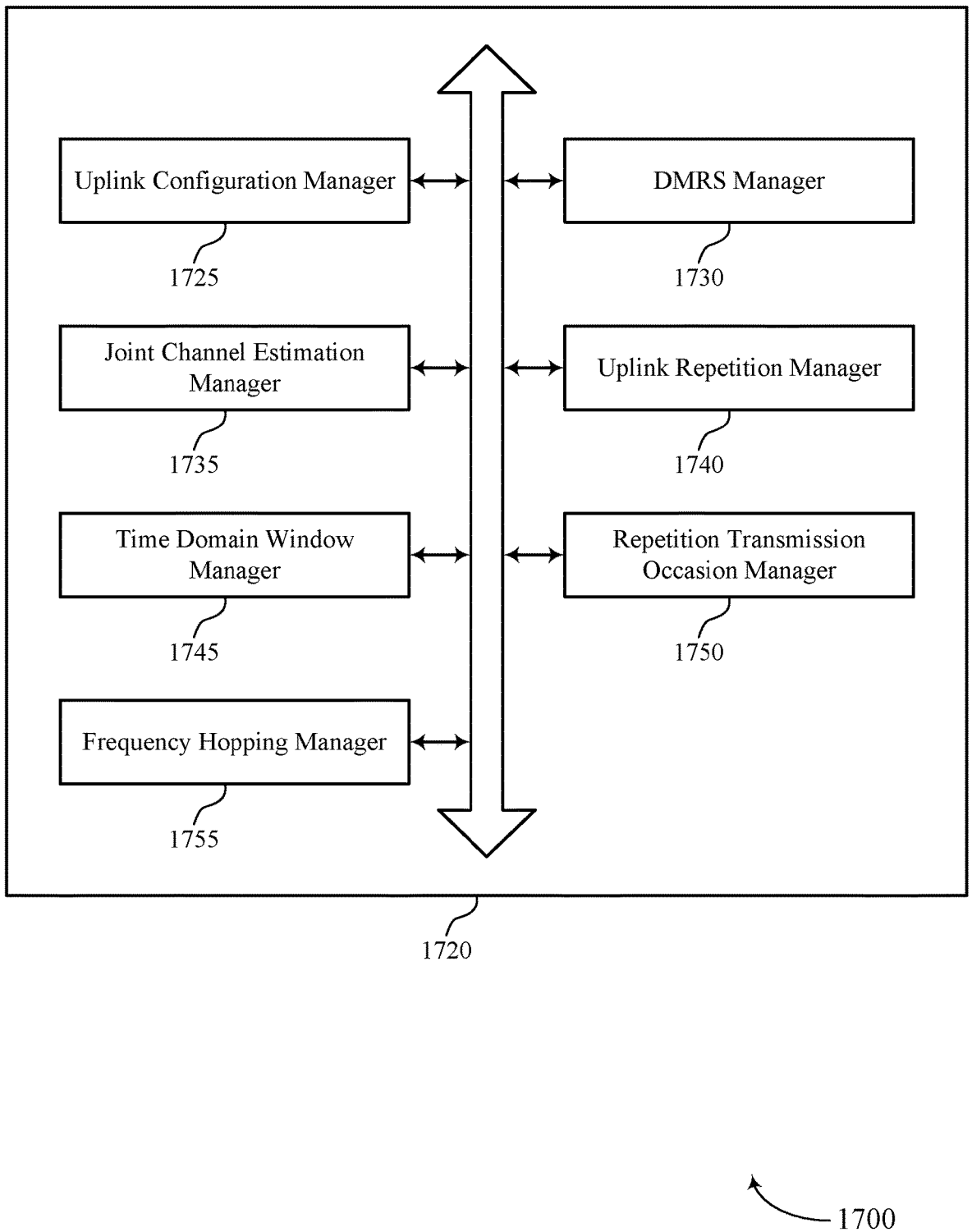
FIG. 17 shows a block diagram of a communications manager that supports uplink demodulation reference signal bundling with beam sweeping in accordance with aspects of the present disclosure.

FIG. 17 shows a block diagram 1700 of a communications manager 1720 that supports uplink demodulation reference signal bundling with beam sweeping in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of uplink demodulation reference signal bundling with beam sweeping as described herein. For example, the communications manager 1720 may include an uplink configuration manager 1725, a DMRS manager 1730, a joint channel estimation manager 1735, an uplink repetition manager 1740, a time domain window manager 1745, a repetition transmission occasion manager 1750, a frequency hopping manager 1755, or any combination thereof. Each of these components may communicate, directly or indirectly, with one another (e.g., via one or more buses).

The communications manager 1720 may support wireless communications at first base station in accordance with examples as disclosed herein. The uplink configuration manager 1725 may be configured as or otherwise support a means for transmitting, to a UE, a control message identifying a configuration for the UE to transmit a set of multiple repetitions of a physical uplink channel using a first set of spatial transmission parameters directed toward the base station and a second set of spatial transmission parameters directed toward a second base station. The DMRS manager 1730 may be configured as or otherwise support a means for receiving, from the UE using the first set of spatial transmission parameters associated with the configuration, a first set of multiple demodulation reference signals associated with the physical uplink channel during at least one of a first transmission time interval or a second transmission time interval. The joint channel estimation manager 1735 may be configured as or otherwise support a means for performing a joint channel estimation procedure in the first transmission time interval and the second transmission time interval based on receiving the first set of multiple demodulation reference signals, where phase continuity is maintained in the first transmission time interval and the second transmission time interval. The uplink repetition manager 1740 may be configured as or otherwise support a means for receiving, from the UE using the first set of spatial transmission parameters associated with the configuration based on the joint channel estimation procedure, a first repetition of the physical uplink channel during the first transmission time interval, and a second repetition of the physical uplink channel during the second transmission time interval.

In some examples, the time domain window manager 1745 may be configured as or otherwise support a means for transmitting, to the UE, configuration information for the UE to determine a set of multiple time domain windows for joint channel estimation, each time domain window associated with a time domain window index of a set of time domain window indices, and a spatial transmission parameter pattern indicating a first subset of the time domain window indices corresponding to the first set of spatial transmission parameters and a second subset of the time domain window indices corresponding to the second set of spatial transmission parameters, where receiving the first repetition of the physical uplink channel and the second repetition of the physical uplink channel is based on the time domain window index of a first time domain window including the first transmission time interval and the second transmission time interval corresponding to the first set of spatial transmission parameters.

In some examples, the repetition transmission occasion manager 1750 may be configured as or otherwise support a means for transmitting, to the UE, configuration information for the UE to determine a set of multiple repetition transmission occasions, at least some of the repetition transmission occasions associated with time domain windows during which the UE is capable of maintaining phase continuity for joint channel estimation, each repetition transmission occasion associated with a repetition transmission occasion index of a set of repetition transmission occasion indices, and a spatial transmission parameter pattern indicating a first subset of the repetition transmission occasion indices corresponding to the first set of spatial transmission parameters and a second subset of the repetition transmission occasion indices corresponding to the second set of spatial transmission parameters, where the first repetition of the physical uplink channel and the second repetition of the physical uplink channel occur in a first repetition transmission occasion including the first transmission time interval and the second transmission time interval, and where receiving the first repetition of the physical uplink channel and the second repetition of the physical uplink channel is based on a repetition transmission occasion index for the first repetition transmission occasion corresponding to the first set of spatial transmission parameters.

In some examples, the frequency hopping manager 1755 may be configured as or otherwise support a means for transmitting, to the UE, configuration information for the UE to determine a set of multiple time domain windows for joint channel estimation, a frequency hopping configuration, a spatial transmission parameter pattern, or any combination thereof, where the first repetition of the physical uplink channel and the second repetition of the physical uplink channel are received on a first set of frequency resources in accordance with the frequency hopping configuration.

In some examples, the frequency hopping manager 1755 may be configured as or otherwise support a means for receiving, from the UE, at least a third repetition of the physical uplink channel using the first set of spatial transmission parameters on a second set of frequency resources in accordance with the frequency hopping configuration during a second time domain window consecutive to the a first time domain window including the first transmission time interval and the second transmission time interval.

In some examples, the frequency hopping manager 1755 may be configured as or otherwise support a means for receiving, from the UE, at least a third repetition of the physical uplink channel using the second set of spatial transmission parameters on the first set of frequency resources in accordance with the frequency hopping configuration during a second time domain window consecutive to a first time domain window including the first transmission time interval and the second transmission time interval.

In some examples, the spatial transmission parameters of the first set of spatial transmission parameters and the second set of spatial transmission parameters include one or more beam configurations, one or more antenna port configurations, one or more spatial domain transmission filters, one or more spatial relations, or any combination thereof.

In some examples, the physical uplink channel includes a physical uplink control channel or a physical uplink shared channel.

Figure 18:
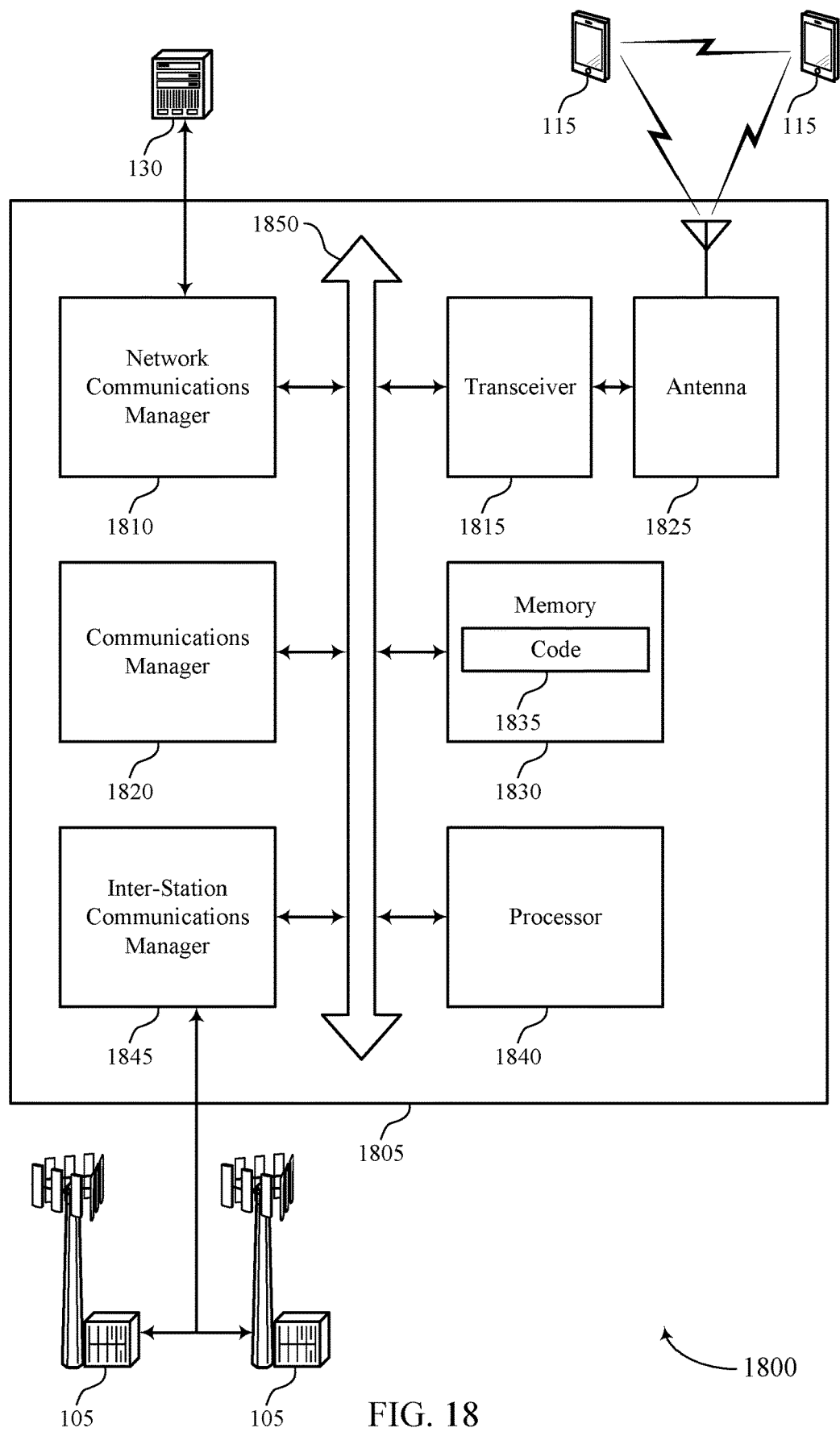
FIG. 18 shows a diagram of a system including a device that supports uplink demodulation reference signal bundling with beam sweeping in accordance with aspects of the present disclosure.

FIG. 18 shows a diagram of a system 1800 including a device 1805 that supports uplink demodulation reference signal bundling with beam sweeping in accordance with aspects of the present disclosure. The device 1805 may be an example of or include the components of a device 1505, a device 1605, or a base station 105 as described herein. The device 1805 may communicate wirelessly with one or more base stations 105, UEs 115, or any combination thereof. The device 1805 may include components for bi-directional voice and data communications including components for transmitting and receiving communications, such as a communications manager 1820, a network communications manager 1810, a transceiver 1815, an antenna 1825, a memory 1830, code 1835, a processor 1840, and an inter-station communications manager 1845. These components may be in electronic communication or otherwise coupled (e.g., operatively, communicatively, functionally, electronically, electrically) via one or more buses (e.g., a bus 1850).

The network communications manager 1810 may manage communications with a core network 130 (e.g., via one or more wired backhaul links). For example, the network communications manager 1810 may manage the transfer of data communications for client devices, such as one or more UEs 115.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a BIOS which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting uplink demodulation reference signal bundling with beam sweeping). For example, the device 1805 or a component of the device 1805 may include a processor 1840 and memory 1830 coupled to the processor 1840, the processor 1840 and memory 1830 configured to perform various functions described herein.

The inter-station communications manager 1845 may manage communications with other base stations 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communications network technology to provide communication between base stations 105.

The communications manager 1820 may support wireless communications at first base station in accordance with examples as disclosed herein. For example, the communications manager 1820 may be configured as or otherwise support a means for transmitting, to a UE, a control message identifying a configuration for the UE to transmit a set of multiple repetitions of a physical uplink channel using a first set of spatial transmission parameters directed toward the base station and a second set of spatial transmission parameters directed toward a second base station. The communications manager 1820 may be configured as or otherwise support a means for receiving, from the UE using the first set of spatial transmission parameters associated with the configuration, a first set of multiple demodulation reference signals associated with the physical uplink channel during at least one of a first transmission time interval or a second transmission time interval. The communications manager 1820 may be configured as or otherwise support a means for performing a joint channel estimation procedure in the first transmission time interval and the second transmission time interval based on receiving the first set of multiple demodulation reference signals, where phase continuity is maintained in the first transmission time interval and the second transmission time interval. The communications manager 1820 may be configured as or otherwise support a means for receiving, from the UE using the first set of spatial transmission parameters associated with the configuration based on the joint channel estimation procedure, a first repetition of the physical uplink channel during the first transmission time interval, and a second repetition of the physical uplink channel during the second transmission time interval.

By including or configuring the communications manager 1820 in accordance with examples as described herein, the device 1805 may support techniques for joint channel estimation resulting in more efficient use of available resources, improved reliability of communications, decreased system latency, and improved user experience.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of uplink demodulation reference signal bundling with beam sweeping as described herein, or the processor 1840 and the memory 1830 may be otherwise configured to perform or support such operations.

Figure 19:
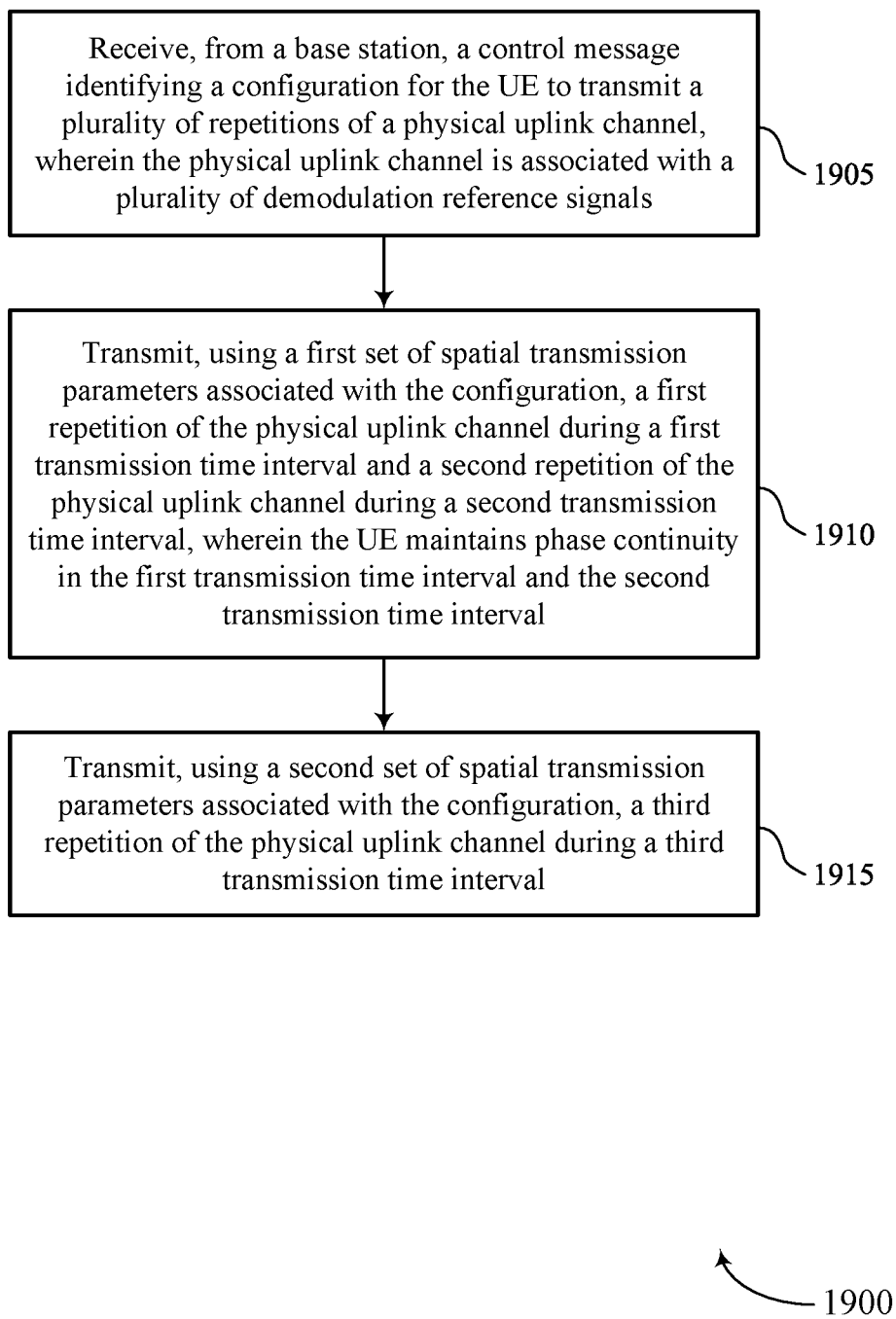
FIGS. 19 and 20 show flowcharts illustrating methods that support uplink demodulation reference signal bundling with beam sweeping in accordance with aspects of the present disclosure.

FIG. 19 shows a flowchart illustrating a method 1900 that supports uplink demodulation reference signal bundling with beam sweeping in accordance with aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, a control message identifying a configuration for the UE to transmit a set of multiple repetitions of a physical uplink channel, where the physical uplink channel is associated with a set of multiple demodulation reference signals. The operations of 1905 may be performed in accordance with examples as disclosed herein. In some examples, aspects of the operations of 1905 may be performed by an uplink configuration manager 1325 as described with reference to FIG. 13.

At 1910, the method may include transmitting, using a first set of spatial transmission parameters associated with the configuration, a first repetition of the physical uplink channel during a first transmission time interval and a second repetition of the physical uplink channel during a second transmission time interval, where the UE maintains phase continuity in the first transmission time interval and the second transmission time interval. The operations of 1910 may be performed in accordance with examples as disclosed herein. In some examples, aspects of the operations of 1910 may be performed by a phase continuity manager 1330 as described with reference to FIG. 13.

At 1915, the method may include transmitting, using a second set of spatial transmission parameters associated with the configuration, a third repetition of the physical uplink channel during a third transmission time interval. The operations of 1915 may be performed in accordance with examples as disclosed herein. In some examples, aspects of the operations of 1915 may be performed by an uplink repetition manager 1335 as described with reference to FIG. 13.

Figure 20:
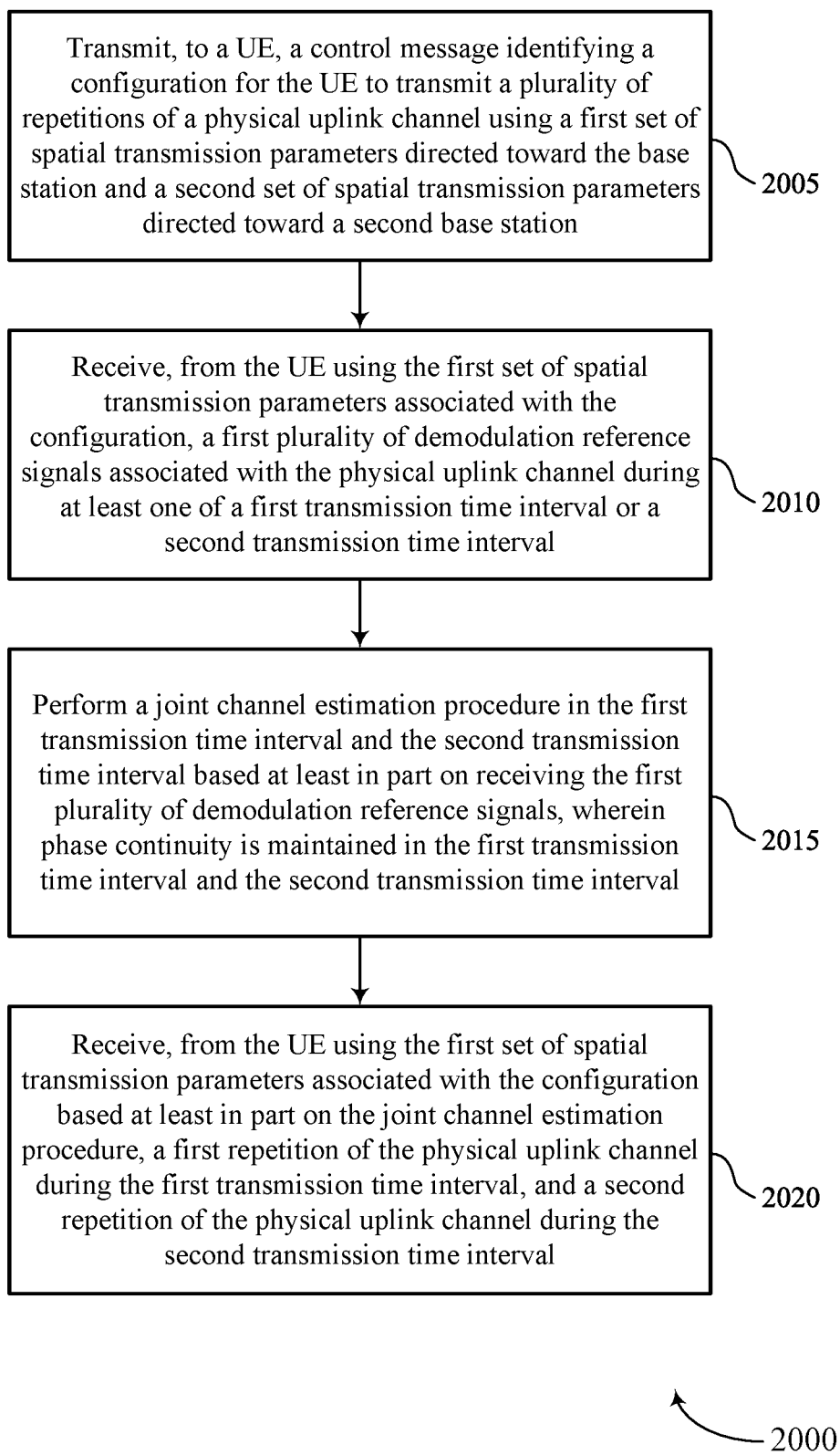

FIG. 20 shows a flowchart illustrating a method 2000 that supports uplink demodulation reference signal bundling with beam sweeping in accordance with aspects of the present disclosure. The operations of the method 2000 may be implemented by a base station or its components as described herein. For example, the operations of the method 2000 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, a control message identifying a configuration for the UE to transmit a set of multiple repetitions of a physical uplink channel using a first set of spatial transmission parameters directed toward the base station and a second set of spatial transmission parameters directed toward a second base station. The operations of 2005 may be performed in accordance with examples as disclosed herein. In some examples, aspects of the operations of 2005 may be performed by an uplink configuration manager 1725 as described with reference to FIG. 17.

At 2010, the method may include receiving, from the UE using the first set of spatial transmission parameters associated with the configuration, a first set of multiple demodulation reference signals associated with the physical uplink channel during at least one of a first transmission time interval or a second transmission time interval. The operations of 2010 may be performed in accordance with examples as disclosed herein. In some examples, aspects of the operations of 2010 may be performed by a DMRS manager 1730 as described with reference to FIG. 17.

At 2015, the method may include performing a joint channel estimation procedure in the first transmission time interval and the second transmission time interval based on receiving the first set of multiple demodulation reference signals, where phase continuity is maintained in the first transmission time interval and the second transmission time interval. The operations of 2015 may be performed in accordance with examples as disclosed herein. In some examples, aspects of the operations of 2015 may be performed by a joint channel estimation manager 1735 as described with reference to FIG. 17.

At 2020, the method may include receiving, from the UE using the first set of spatial transmission parameters associated with the configuration based on the joint channel estimation procedure, a first repetition of the physical uplink channel during the first transmission time interval, and a second repetition of the physical uplink channel during the second transmission time interval. The operations of 2020 may be performed in accordance with examples as disclosed herein. In some examples, aspects of the operations of 2020 may be performed by an uplink repetition manager 1740 as described with reference to FIG. 17.

The following provides an overview of aspects of the present disclosure:

Aspect 1: A method for wireless communications at a user equipment, comprising: receiving, from a base station, a control message identifying a configuration for the UE to transmit a plurality of repetitions of a physical uplink channel, wherein the physical uplink channel is associated with a plurality of demodulation reference signals; transmitting, using a first set of spatial transmission parameters associated with the configuration, a first repetition of the physical uplink channel during a first transmission time interval and a second repetition of the physical uplink channel during a second transmission time interval, wherein the UE maintains phase continuity in the first transmission time interval and the second transmission time interval; and transmitting, using a second set of spatial transmission parameters associated with the configuration, a third repetition of the physical uplink channel during a third transmission time interval.

Aspect 2: The method of aspect 1, further comprising: receiving, from the base station, configuration information for the UE to determine a plurality of time domain windows for joint channel estimation, each time domain window associated with a time domain window index of a set of time domain window indices, and a spatial transmission parameter pattern indicating a first subset of the time domain window indices corresponding to the first set of spatial transmission parameters and a second subset of the time domain window indices corresponding to the second set of spatial transmission parameters.

Aspect 3: The method of aspect 2, further comprising: maintaining phase continuity of the first repetition of the physical uplink channel and the second repetition of the physical uplink channel in the first transmission time interval and the second transmission time interval according to one or more phase continuity requirements, wherein the first transmission time interval and the second transmission time interval are located in a first time domain window of the plurality of time domain windows corresponding to one of the first subset of the time domain window indices Aspect 4: The method of aspect 3, wherein the third transmission time interval is located in a second time domain window corresponding to one of the second subset of the time domain window indices.

Aspect 5: The method of any of aspects 3 through 4, further comprising: transmitting, based at least in part on the spatial transmission parameter pattern, a fourth repetition of the physical uplink channel using the first set of spatial transmission parameters during a fourth transmission time interval located in the first time domain window, wherein the UE is not capable of maintaining phase continuity in the fourth transmission time interval and at least one of the first transmission time interval or the second transmission time interval.

Aspect 6: The method of any of aspects 2 through 5, accord, wherein the third transmission time interval is located in the first time domain window corresponding to one of the first subset of the time domain window indices.

Aspect 7: The method of aspect 6, further comprising: determining that the UE is capable of maintaining phase continuity in the first transmission time interval and the second transmission time interval, and that the UE is not capable of maintaining phase continuity in the third transmission time interval and at least one of the first transmission time interval or the second transmission time interval, wherein maintaining phase continuity in the first transmission time interval and the second transmission time interval is based at least in part on the determining.

Aspect 8: The method of any of aspects 1 through 7, further comprising: receiving, from the base station, configuration information for the UE to determine a plurality of repetition transmission occasions, at least some of the repetition transmission occasions associated with time domain windows during which the UE may maintain phase continuity for joint channel estimation, each repetition transmission occasion associated with a repetition transmission occasion index of a set of repetition transmission occasion indices, and a spatial transmission parameter pattern indicating a first subset of the repetition transmission occasion indices corresponding to the first set of spatial transmission parameters and a second subset of the repetition transmission occasion indices corresponding to the second set of spatial transmission parameters.

Aspect 9: The method of aspect 8, further comprising: maintaining phase continuity of the first repetition of the physical uplink channel and the second repetition of the physical uplink channel in the first transmission time interval and the second transmission time interval according to one or more phase continuity requirements, wherein the first transmission time interval and the second transmission time interval are located in a first repetition transmission occasion corresponding to one of the first subset of the time domain window indices; wherein the third transmission time interval is located in a second repetition transmission occasion corresponding to one of the second subset of the repetition transmission occasion indices.

Aspect 10: The method of aspect 9, further comprising: determining that the UE is capable of maintaining phase continuity in the first transmission time interval and the second transmission time interval, and that the UE is not capable of maintaining phase continuity in the third transmission time interval and at least one of the first transmission time interval or the second transmission time interval, wherein maintaining phase continuity in the first transmission time interval and the second transmission time interval is based at least in part on the determining.

Aspect 11: The method of any of aspects 1 through 10, further comprising: receiving, from the base station, configuration information for the UE to determine a plurality of time domain windows for joint channel estimation, a frequency hopping configuration, a spatial transmission parameter pattern, or any combination thereof; maintaining phase continuity of the first repetition of the physical uplink channel and the second repetition of the physical uplink channel in the first transmission time interval and the second transmission time interval according to one or more phase continuity requirements; and maintaining phase continuity of the third repetition of the physical uplink channel and a fourth repetition of the uplink physical channel in the third transmission time interval and a fourth transmission time interval according to the one or more phase continuity requirements, wherein the fourth repetition of the physical uplink channel is transmitted during the fourth transmission time interval using the second set of spatial transmission parameters; maintaining phase continuity of a first set of one or more additional repetitions of the physical uplink channel in a fifth transmission time interval and a sixth transmission time interval according to the one or more phase continuity requirements, wherein the first set of one or more additional repetitions of the physical uplink channel are transmitted during the fifth transmission time interval and the sixth transmission time interval using the first set of spatial transmission parameters; and maintaining phase continuity of a second set of one or more additional repetitions of the physical uplink channel in a seventh transmission time interval and an eighth transmission time interval according to the one or more phase continuity requirements, wherein the second set of one or more additional repetitions of the physical uplink channel are transmitted during the seventh transmission time interval and the eighth transmission time interval using the second set of spatial transmission parameters.

Aspect 12: The method of aspect 11, wherein the first transmission time interval and the second transmission time interval are located in a first time domain window; the third transmission time interval and the fourth transmission time interval are located in a second time domain window; the fifth transmission time interval and the sixth transmission time interval are located in a third time domain window; and the seventh transmission time interval and the eight transmission time interval are located in a fourth time domain window.

Aspect 13: The method of aspect 12, further comprising: selecting, based at least in part on the frequency hopping configuration comprising a cyclic frequency hopping configuration, a first set of frequency resources for transmissions during the first time domain window and the second time domain window, and a second set of frequency resources for transmissions during the third time domain window and the fourth time domain window, wherein the first time domain window precedes the third time domain window, the third time domain window precedes the second time domain window, and the second time domain window precedes the fourth time domain window in time.

Aspect 14: The method of any of aspects 12 through 13, further comprising: selecting, based at least in part on the frequency hopping configuration comprising a sequential frequency hopping configuration, a first set of frequency resources for transmissions during the first time domain window and the third time domain window and a second set of frequency resources for transmissions during the second time domain window and the fourth time domain window, wherein the first time domain window and the second time domain window precedes the third time domain window and the fourth time domain window in time.

Aspect 15: The method of any of aspects 1 through 14, wherein the spatial transmission parameters comprise one or more beam configurations, one or more antenna port configurations, one or more spatial domain transmission filters, one or more spatial relations, or any combination thereof.

Aspect 16: The method of any of aspects 1 through 15, wherein the first set of spatial transmission parameters is directed toward a first wireless device; and the second set of spatial transmission parameters is directed toward a second wireless device.

Aspect 17: The method of any of aspects 1 through 16, wherein the physical uplink channel comprises a physical uplink control channel or a physical uplink shared channel.

Aspect 18: A method for wireless communications at first base station, comprising: transmitting, to a UE, a control message identifying a configuration for the UE to transmit a plurality of repetitions of a physical uplink channel using a first set of spatial transmission parameters directed toward the base station and a second set of spatial transmission parameters directed toward a second base station; receiving, from the UE using the first set of spatial transmission parameters associated with the configuration, a first plurality of demodulation reference signals associated with the physical uplink channel during at least one of a first transmission time interval or a second transmission time interval; performing a joint channel estimation procedure in the first transmission time interval and the second transmission time interval based at least in part on receiving the first plurality of demodulation reference signals, wherein phase continuity is maintained in the first transmission time interval and the second transmission time interval; and receiving, from the UE using the first set of spatial transmission parameters associated with the configuration based at least in part on the joint channel estimation procedure, a first repetition of the physical uplink channel during the first transmission time interval, and a second repetition of the physical uplink channel during the second transmission time interval.

Aspect 19: The method of aspect 18, further comprising: transmitting, to the UE, configuration information for the UE to determine a plurality of time domain windows for joint channel estimation, each time domain window associated with a time domain window index of a set of time domain window indices, and a spatial transmission parameter pattern indicating a first subset of the time domain window indices corresponding to the first set of spatial transmission parameters and a second subset of the time domain window indices corresponding to the second set of spatial transmission parameters, wherein receiving the first repetition of the physical uplink channel and the second repetition of the physical uplink channel is based at least in part on the time domain window index of a first time domain window comprising the first transmission time interval and the second transmission time interval corresponding to the first set of spatial transmission parameters.

Aspect 20: The method of any of aspects 18 through 19, further comprising: transmitting, to the UE, configuration information for the UE to determine a plurality of repetition transmission occasions, at least some of the repetition transmission occasions associated with time domain windows during which the UE may maintain phase continuity for joint channel estimation, each repetition transmission occasion associated with a repetition transmission occasion index of a set of repetition transmission occasion indices, and a spatial transmission parameter pattern indicating a first subset of the repetition transmission occasion indices corresponding to the first set of spatial transmission parameters and a second subset of the repetition transmission occasion indices corresponding to the second set of spatial transmission parameters, wherein the first repetition of the physical uplink channel and the second repetition of the physical uplink channel occur in a first repetition transmission occasion comprising the first transmission time interval and the second transmission time interval, and wherein receiving the first repetition of the physical uplink channel and the second repetition of the physical uplink channel is based at least in part on a repetition transmission occasion index for the first repetition transmission occasion corresponding to the first set of spatial transmission parameters.

Aspect 21: The method of any of aspects 18 through 20, further comprising: transmitting, to the UE, configuration information for the UE to determine a plurality of time domain windows for joint channel estimation, a frequency hopping configuration, a spatial transmission parameter pattern, or any combination thereof, wherein the first repetition of the physical uplink channel and the second repetition of the physical uplink channel are received on a first set of frequency resources in accordance with the frequency hopping configuration.

Aspect 22: The method of aspect 21, further comprising: receiving, from the UE, at least a third repetition of the physical uplink channel using the first set of spatial transmission parameters on a second set of frequency resources in accordance with the frequency hopping configuration during a second time domain window consecutive to the a first time domain window comprising the first transmission time interval and the second transmission time interval.

Aspect 23: The method of any of aspects 21 through 22, further comprising: receiving, from the UE, at least a third repetition of the physical uplink channel using the second set of spatial transmission parameters on the first set of frequency resources in accordance with the frequency hopping configuration during a second time domain window consecutive to a first time domain window comprising the first transmission time interval and the second transmission time interval.

Aspect 24: The method of any of aspects 18 through 23, wherein the spatial transmission parameters comprise one or more beam configurations, one or more antenna port configurations, one or more spatial domain transmission filters, one or more spatial relations, or any combination thereof.

Aspect 25: The method of any of aspects 18 through 24, wherein the physical uplink channel comprises a physical uplink control channel or a physical uplink shared channel.

Aspect 26: An apparatus for wireless communications at a user equipment, comprising a processor; memory coupled with the processor; and instructions stored in the memory and executable by the processor to cause the apparatus to perform a method of any of aspects 1 through 17.

Aspect 27: An apparatus for wireless communications at a user equipment, comprising at least one means for performing a method of any of aspects 1 through 17.

Aspect 28: A non-transitory computer-readable medium storing code for wireless communications at a user equipment, the code comprising instructions executable by a processor to perform a method of any of aspects 1 through 17.

Aspect 29: An apparatus for wireless communications at first base station, comprising a processor; memory coupled with the processor; and instructions stored in the memory and executable by the processor to cause the apparatus to perform a method of any of aspects 18 through 25.

Aspect 30: An apparatus for wireless communications at first base station, comprising at least one means for performing a method of any of aspects 18 through 25.

Aspect 31: A non-transitory computer-readable medium storing code for wireless communications at first base station, the code comprising instructions executable by a processor to perform a method of any of aspects 18 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment, comprising:
    receiving, from a base station, a control message identifying a configuration for the UE to transmit a plurality of repetitions of a physical uplink channel, wherein the physical uplink channel is associated with a plurality of demodulation reference signals;
    transmitting, using a first set of spatial transmission parameters associated with the configuration, a first repetition of the physical uplink channel during a first transmission time interval and a second repetition of the physical uplink channel during a second transmission time interval, wherein the UE maintains phase continuity in the first transmission time interval and the second transmission time interval;
    transmitting, using a second set of spatial transmission parameters associated with the configuration, a third repetition of the physical uplink channel during a third transmission time interval; and
    receiving, from the base station, configuration information for the UE to determine a plurality of repetition transmission occasions, at least some of the repetition transmission occasions associated with time domain windows during which the UE is capable of maintaining phase continuity for joint channel estimation, each repetition transmission occasion associated with a repetition transmission occasion index of a set of repetition transmission occasion indices, and a spatial transmission parameter pattern indicating a first subset of the repetition transmission occasion indices corresponding to the first set of spatial transmission parameters and a second subset of the repetition transmission occasion indices corresponding to the second set of spatial transmission parameters.

2. The method of claim 1, further comprising:
    maintaining phase continuity of the first repetition of the physical uplink channel and the second repetition of the physical uplink channel in the first transmission time interval and the second transmission time interval according to one or more phase continuity requirements, wherein the first transmission time interval and the second transmission time interval are located in a first repetition transmission occasion corresponding to one of the first subset of the time domain window indices;
    wherein the third transmission time interval is located in a second repetition transmission occasion corresponding to one of the second subset of the repetition transmission occasion indices.

3. The method of claim 2, further comprising:
    determining that the UE is capable of maintaining phase continuity in the first transmission time interval and the second transmission time interval, and that the UE is not capable of maintaining phase continuity in the third transmission time interval and at least one of the first transmission time interval or the second transmission time interval, wherein maintaining phase continuity in the first transmission time interval and the second transmission time interval is based at least in part on the determining.

4. The method of claim 1, wherein the spatial transmission parameters of the first set of spatial transmission parameters and the second set of spatial transmission parameters comprise one or more beam configurations, one or more antenna port configurations, one or more spatial domain transmission filters, one or more spatial relations, or any combination thereof.

5. The method of claim 1, wherein:
    the first set of spatial transmission parameters is directed toward a first wireless device; and
    the second set of spatial transmission parameters is directed toward a second wireless device.

6. The method of claim 1, wherein the physical uplink channel comprises a physical uplink control channel or a physical uplink shared channel.

7. A method for wireless communications at first base station, comprising:
    transmitting, to a user equipment (UE), a control message identifying a configuration for the UE to transmit a plurality of repetitions of a physical uplink channel using a first set of spatial transmission parameters directed toward the base station and a second set of spatial transmission parameters directed toward a second base station;
    receiving, from the UE using the first set of spatial transmission parameters associated with the configuration, a first plurality of demodulation reference signals associated with the physical uplink channel during at least one of a first transmission time interval or a second transmission time interval;
    performing a joint channel estimation procedure in the first transmission time interval and the second transmission time interval based at least in part on receiving the first plurality of demodulation reference signals, wherein phase continuity is maintained in the first transmission time interval and the second transmission time interval;
    receiving, from the UE using the first set of spatial transmission parameters associated with the configuration based at least in part on the joint channel estimation procedure, a first repetition of the physical uplink channel during the first transmission time interval, and a second repetition of the physical uplink channel during the second transmission time interval; and
    transmitting, to the UE, configuration information for the UE to determine a plurality of repetition transmission occasions, at least some of the repetition transmission occasions associated with time domain windows during which the UE is capable of maintaining phase continuity for joint channel estimation, each repetition transmission occasion associated with a repetition transmission occasion index of a set of repetition transmission occasion indices, and a spatial transmission parameter pattern indicating a first subset of the repetition transmission occasion indices corresponding to the first set of spatial transmission parameters and a second subset of the repetition transmission occasion indices corresponding to the second set of spatial transmission parameters, wherein the first repetition of the physical uplink channel and the second repetition of the physical uplink channel occur in a first repetition transmission occasion comprising the first transmission time interval and the second transmission time interval, and wherein receiving the first repetition of the physical uplink channel and the second repetition of the physical uplink channel is based at least in part on a repetition transmission occasion index for the first repetition transmission occasion corresponding to the first set of spatial transmission parameters.

8. The method of claim 7, wherein the spatial transmission parameters of the first set of spatial transmission parameters and the second set of spatial transmission parameters comprise one or more beam configurations, one or more antenna port configurations, one or more spatial domain transmission filters, one or more spatial relations, or any combination thereof.

9. The method of claim 7, wherein the physical uplink channel comprises a physical uplink control channel or a physical uplink shared channel.

10. An apparatus for wireless communications at a user equipment, comprising:
a processor;
memory in electronic communication with the processor; and
instructions stored in the memory, wherein the instructions are executable by the processor to:
receive, from a base station, a control message identifying a configuration for the UE to transmit a plurality of repetitions of a physical uplink channel, wherein the physical uplink channel is associated with a plurality of demodulation reference signals;
transmit, using a first set of spatial transmission parameters associated with the configuration, a first repetition of the physical uplink channel during a first transmission time interval and a second repetition of the physical uplink channel during a second transmission time interval, wherein the UE maintains phase continuity in the first transmission time interval and the second transmission time interval;
transmit, using a second set of spatial transmission parameters associated with the configuration, a third repetition of the physical uplink channel during a third transmission time interval; and
receive, from the base station, configuration information for the UE to determine a plurality of repetition transmission occasions, at least some of the repetition transmission occasions associated with time domain windows during which the UE is capable of maintaining phase continuity for joint channel estimation, each repetition transmission occasion associated with a repetition transmission occasion index of a set of repetition transmission occasion indices, and a spatial transmission parameter pattern indicating a first subset of the repetition transmission occasion indices corresponding to the first set of spatial transmission parameters and a second subset of the repetition transmission occasion indices corresponding to the second set of spatial transmission parameters.

11. An apparatus for wireless communications at first base station, comprising:
a processor;
memory in electronic communication with the processor; and
instructions stored in the memory, wherein the instructions are executable by the processor to:
transmit, to a user equipment (UE), a control message identifying a configuration for the UE to transmit a plurality of repetitions of a physical uplink channel using a first set of spatial transmission parameters directed toward the base station and a second set of spatial transmission parameters directed toward a second base station;
receive, from the UE using the first set of spatial transmission parameters associated with the configuration, a first plurality of demodulation reference signals associated with the physical uplink channel during at least one of a first transmission time interval or a second transmission time interval;
perform a joint channel estimation procedure in the first transmission time interval and the second transmission time interval based at least in part on receiving the first plurality of demodulation reference signals, wherein phase continuity is maintained in the first transmission time interval and the second transmission time interval;
receive, from the UE using the first set of spatial transmission parameters associated with the configuration based at least in part on the joint channel estimation procedure, a first repetition of the physical uplink channel during the first transmission time interval, and a second repetition of the physical uplink channel during the second transmission time interval; and
transmit, to the UE, configuration information for the UE to determine a plurality of repetition transmission occasions, at least some of the repetition transmission occasions associated with time domain windows during which the UE is capable of maintaining phase continuity for joint channel estimation, each repetition transmission occasion associated with a repetition transmission occasion index of a set of repetition transmission occasion indices, and a spatial transmission parameter pattern indicating a first subset of the repetition transmission occasion indices corresponding to the first set of spatial transmission parameters and a second subset of the repetition transmission occasion indices corresponding to the second set of spatial transmission parameters, wherein the first repetition of the physical uplink channel and the second repetition of the physical uplink channel occur in a first repetition transmission occasion comprising the first transmission time interval and the second transmission time interval, and wherein receiving the first repetition of the physical uplink channel and the second repetition of the physical uplink channel is based at least in part on a repetition transmission occasion index for the first repetition transmission occasion corresponding to the first set of spatial transmission parameters.

* * * * *